(12) United States Patent
Wang et al.

(10) Patent No.: US 8,194,061 B2
(45) Date of Patent: Jun. 5, 2012

(54) PROCESS AND SYSTEM OF POWER SAVING LIGHTING

(75) Inventors: Randall Wang, Temple City, CA (US); James Parker, Temple City, CA (US)

(73) Assignee: EE Systems Group Inc., Temple City, CA (US)

( * ) Notice: Subject to any disclaimer, the term of this patent is extended or adjusted under 35 U.S.C. 154(b) by 1009 days.

(21) Appl. No.: 11/891,687

(22) Filed: Aug. 9, 2007

(65) Prior Publication Data
US 2009/0039797 A1 Feb. 12, 2009

(51) Int. Cl.
*G09G 5/00* (2006.01)
*G09G 3/32* (2006.01)
*H05B 37/02* (2006.01)

(52) U.S. Cl. .......................... 345/211; 345/82; 315/149

(58) Field of Classification Search .................... 345/82, 345/211; 315/149, 325; 323/283
See application file for complete search history.

(56) References Cited

U.S. PATENT DOCUMENTS

| | | | | |
|---|---|---|---|---|
| 4,486,820 A | * | 12/1984 | Baba et al. | 362/183 |
| 5,572,108 A | * | 11/1996 | Windes | 320/167 |
| 6,592,245 B1 | * | 7/2003 | Tribelsky et al. | 362/551 |
| 2003/0067399 A1 | * | 4/2003 | Wesley | 340/907 |
| 2004/0095121 A1 | * | 5/2004 | Kernahan et al. | 323/283 |
| 2006/0022214 A1 | * | 2/2006 | Morgan et al. | 257/99 |
| 2006/0149607 A1 | * | 7/2006 | Sayers et al. | 705/7 |
| 2006/0220895 A1 | * | 10/2006 | Arcaria et al. | 340/815.4 |
| 2008/0238345 A1 | * | 10/2008 | Jaan | 315/325 |
| 2008/0278934 A1 | * | 11/2008 | Maldonado | 362/183 |

* cited by examiner

*Primary Examiner* — Kevin M Nguyen
(74) *Attorney, Agent, or Firm* — Raymond Y. Chan; David and Raymond Patent Firm

(57) ABSTRACT

A process and system of lighting with green energy source and intelligent power management, which saves energy consuming and limits pollution. The system is using solar power, green battery, and LED which are clean, long life; save, and energy saving. A microcontroller coordinates devices and sensors to optimize the operation of the system to generate illumination. The process includes the steps of sensing the environment, selecting power source, determining the energy output and driving the light device in order to most efficiently using energy and generate sufficient light for different purposes.

28 Claims, 28 Drawing Sheets

*Two Sample Windows (1000-2000 & 4000-5000)*

*Discontinuity*

PROCESS AND SYSTEM OF POWER SAVING LIGHTING

BACKGROUND OF THE PRESENT INVENTION

1. Field of Invention

The present invention relates to lighting, and more particularly to a process and system of lighting with green energy and intelligent power management.

2. Description of Related Arts

Global warming and energy consuming are issues being concerned more and more by governments and industry. Energy conservation and green power development are solutions practically employed in many fields of applications.

Lighting occupies a big ratio in energy consuming. It takes great responsibility in the issue of energy problem. Many different attempts are being applied in lighting product development individually. In the aspect of energy source, green energy, such as solar energy and green battery are utilized. In the aspect of lighting equipment, energy saving bulbs and light-emitting diode (LED) are developed. In the aspect of power management, light sensors and timers are used to switch on and off the lighting system.

Solar power is clean and cheap, it generates no wastes and pollution, and in sunny area, it can be easily obtained can work independent from other supporting equipment such as power supply cable. Currently solar power is widely use in many power saving fields, especially in remote area, and mobile appliances where civil power network is not available.

Green battery is another attempt for energy saving. Green battery is developed rapidly in recent time. It is safe and efficient, and produces no pollution. Newly developed techniques such as charging and discharge control highly improved the life time and efficiency of the green batteries.

While in lighting area there is still lacking an integrated system which concerns all these aspects at the same time and give a solution systematically, especially in cooperating of different components in a lighting system and intelligent management of power consuming.

SUMMARY OF THE PRESENT INVENTION

A main object of the present invention is to provide a process and system of energy saving lighting that efficiently manages the energy consuming.

Another object of the present invention is to provide a process and system of energy saving lighting that using multiple energy sources including green energy.

Another object of the present invention is to provide a process and system of energy saving lighting that using environmental conservation light devices.

Another object of the present invention is to provide a process and system of energy saving lighting having smart sensors for sensing the environment for better power management.

Another object of the present invention is to provide a process and system of energy saving lighting that has the communication capability.

Another object of the present invention is to provide a process and system of energy saving lighting that is used in security systems for enhancing the system performance purpose.

Another object of the present invention is to provide a process and system of energy saving lighting that can be used for multiple purposes.

Accordingly, in order to accomplish the above objects, the present invention provides a process of energy saving lighting, comprising the steps of:

(a) sensing the environment situation and the power supply status wherein to generate power control reference information;

(b) selecting an power source regarding said reference information wherein to guarantee power supply and maximally save power;

(c) deciding lighting output regarding said reference information and said selected power source wherein to generate minimally required light; and (d) driving lighting devices.

The energy saving lighting described above is processed in a system comprising:

a sensor component sensing the environment situation and the status of said power supply component to generate power control reference information;

a microcontroller electrically connected with said sensor component, wherein receives said reference information from said sensor component, decides an energy saving lighting plan according to said reference information, and controls power output lighting devices;

a light component which is powered by said power supply component and is controlled by said microcontroller to generate light; and a power supply component supplying electrical power to said system, which further comprises: a solar power supply; a rechargeable battery element; and/or an AC power supply.

These and other objectives, features, and advantages of the present invention will become apparent from the following detailed description, the accompanying drawings, and the appended claims.

DETAILED DESCRIPTION OF THE PREFERRED EMBODIMENT

Figure 1:
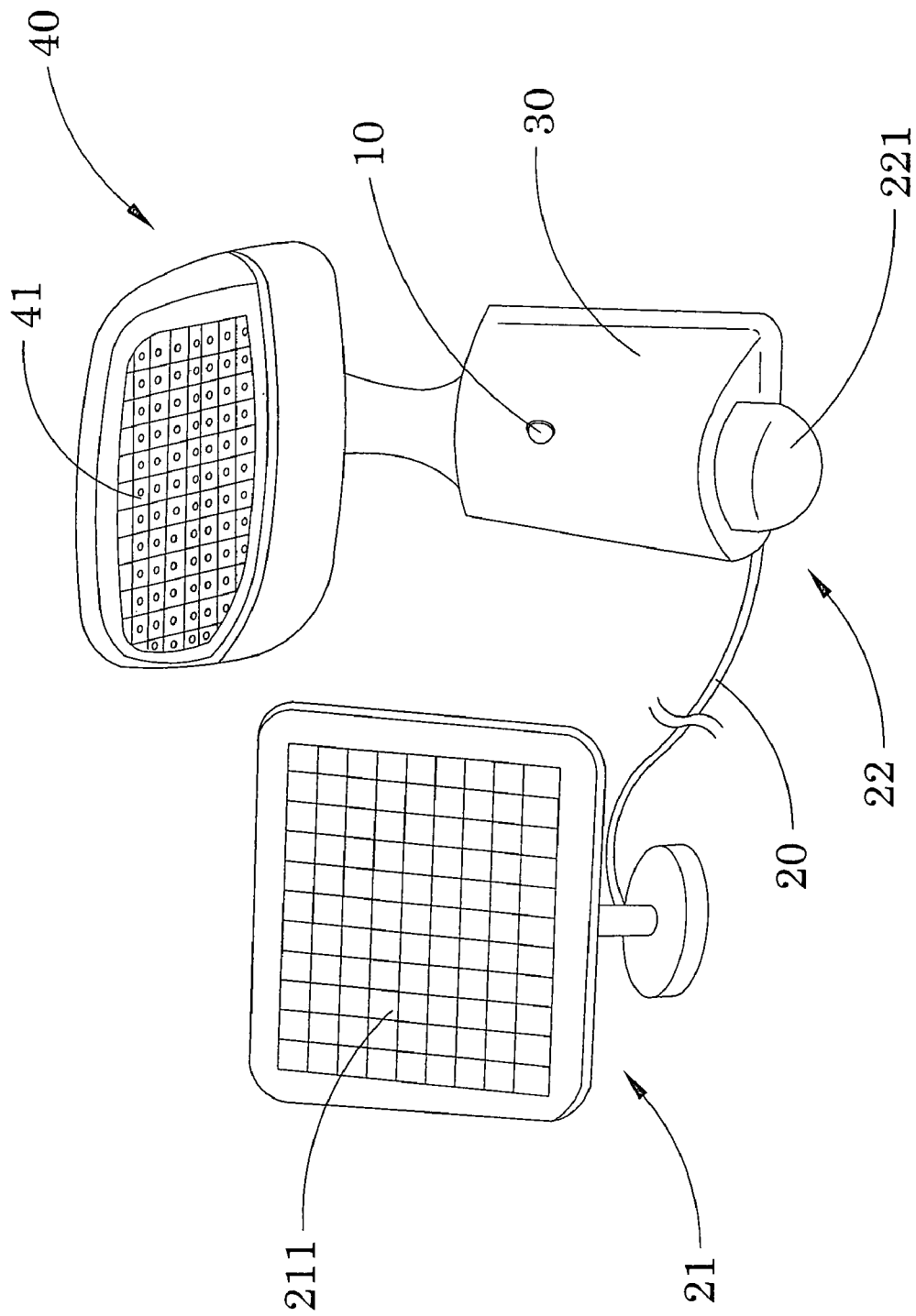
FIG. 1 is a perspective view illustrating a system of energy saving lighting according to a preferred embodiment of the present invention.
Figure 2A:
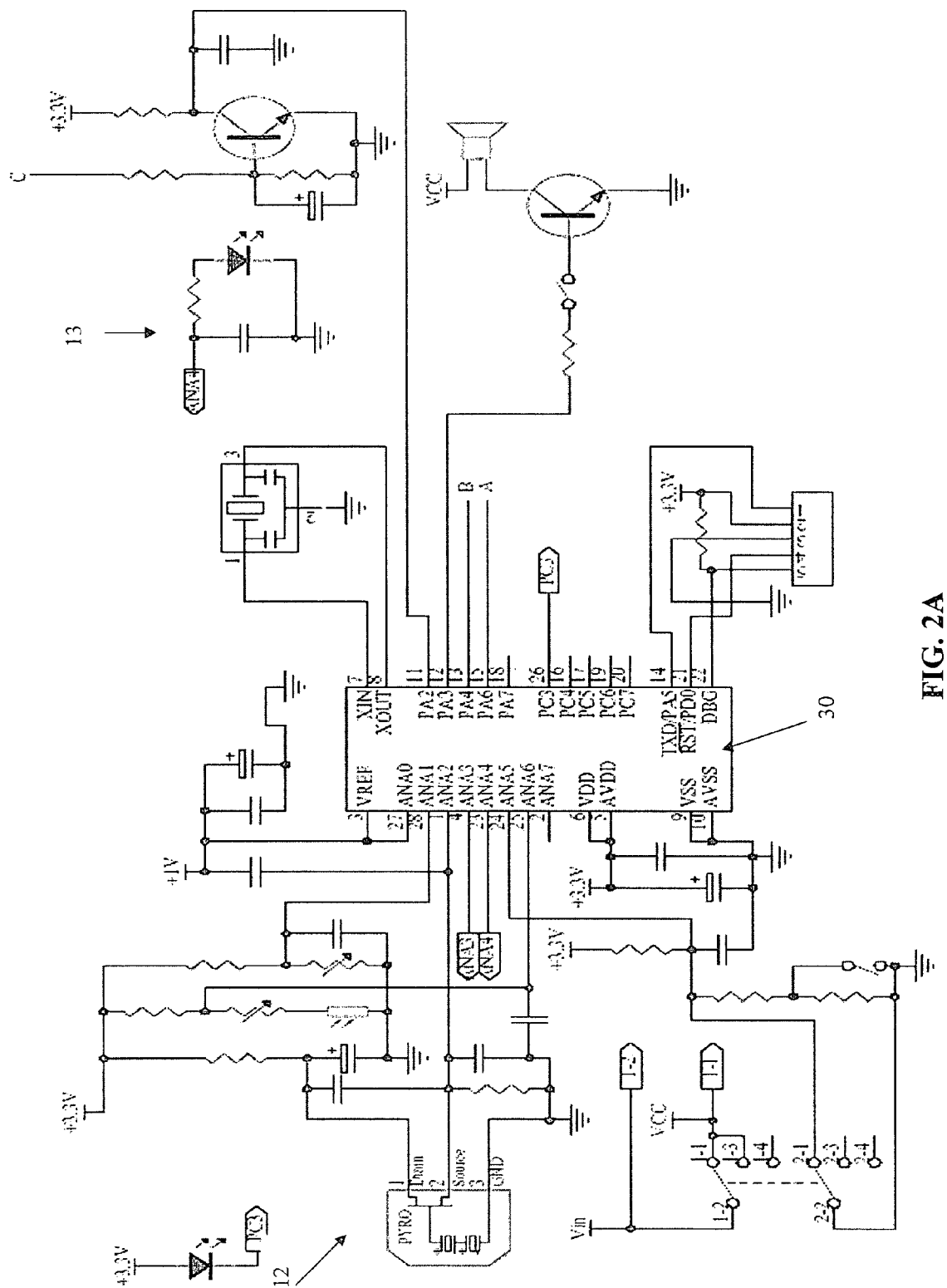
FIG. 2A is a circuit diagram of the microcontroller of the system of energy saving lighting according to the above preferred embodiment of the present invention.
Figure 2B:
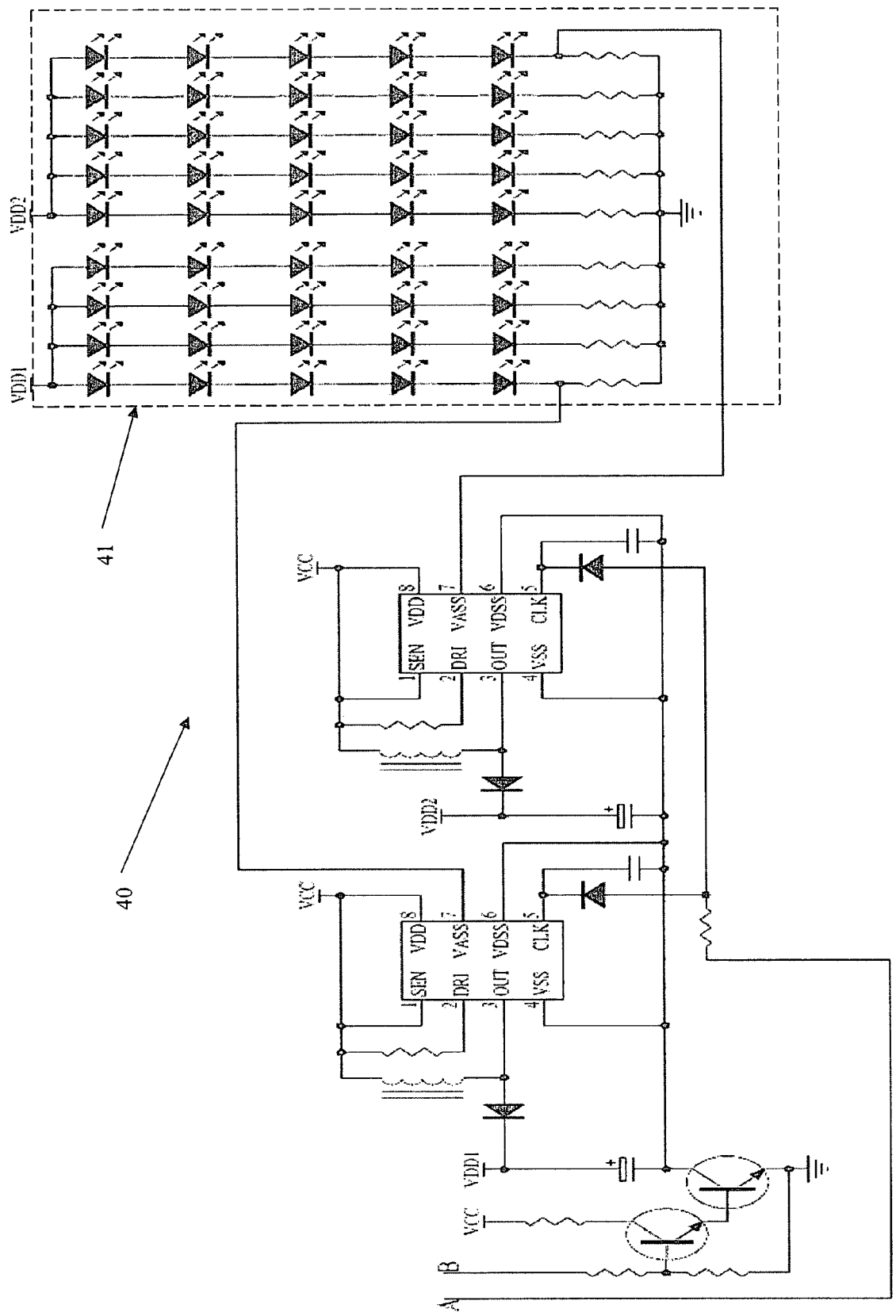
FIG. 2B is a circuit diagram of the light component of the system of energy saving lighting according to the above preferred embodiment of the present invention.
Figure 2C:
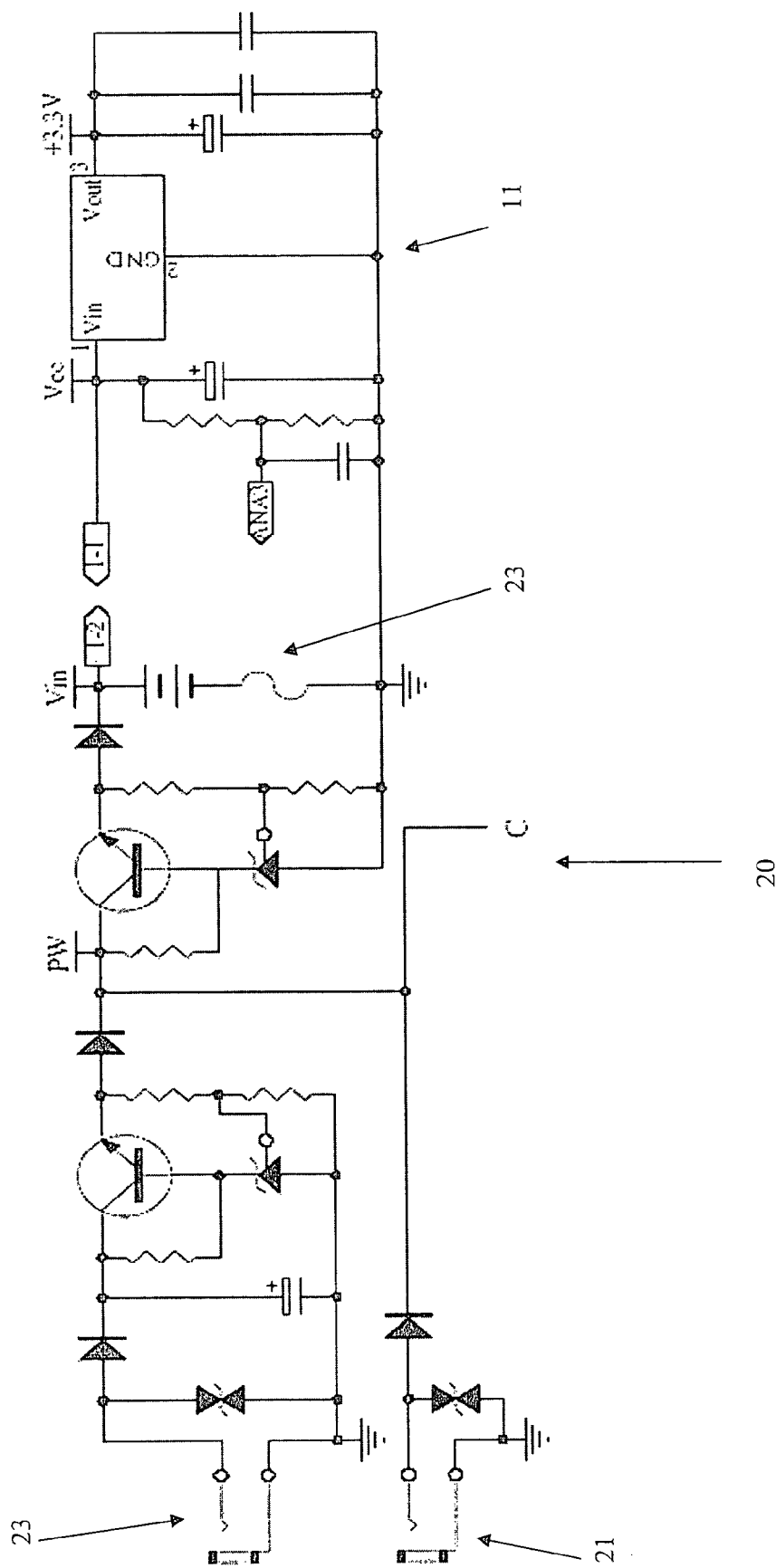
FIG. 2C is a circuit diagram of the power supply component of the system of energy saving lighting according to the above preferred embodiment of the present invention.

Referring to FIGS. 1-4, the present invention provides a process and system of power saving lighting according to a preferred embodiment. The process and system provides illumination, at the same time intelligently saves power consumption. Referring to FIGS. 1 and 2, in a preferred embodiment of the present invention, the system of power saving lighting comprises: a sensor component 10 which is monitoring the condition of the environment and the system to generate reference information; a power supply component 20 which supplies the power for the operation of the system; a light component 40 which generates light; and a microcontroller 30 which receives reference information from the sensor component 10, controls the operation of the power supply component 20, and drives the light component 40.

Figure 3:
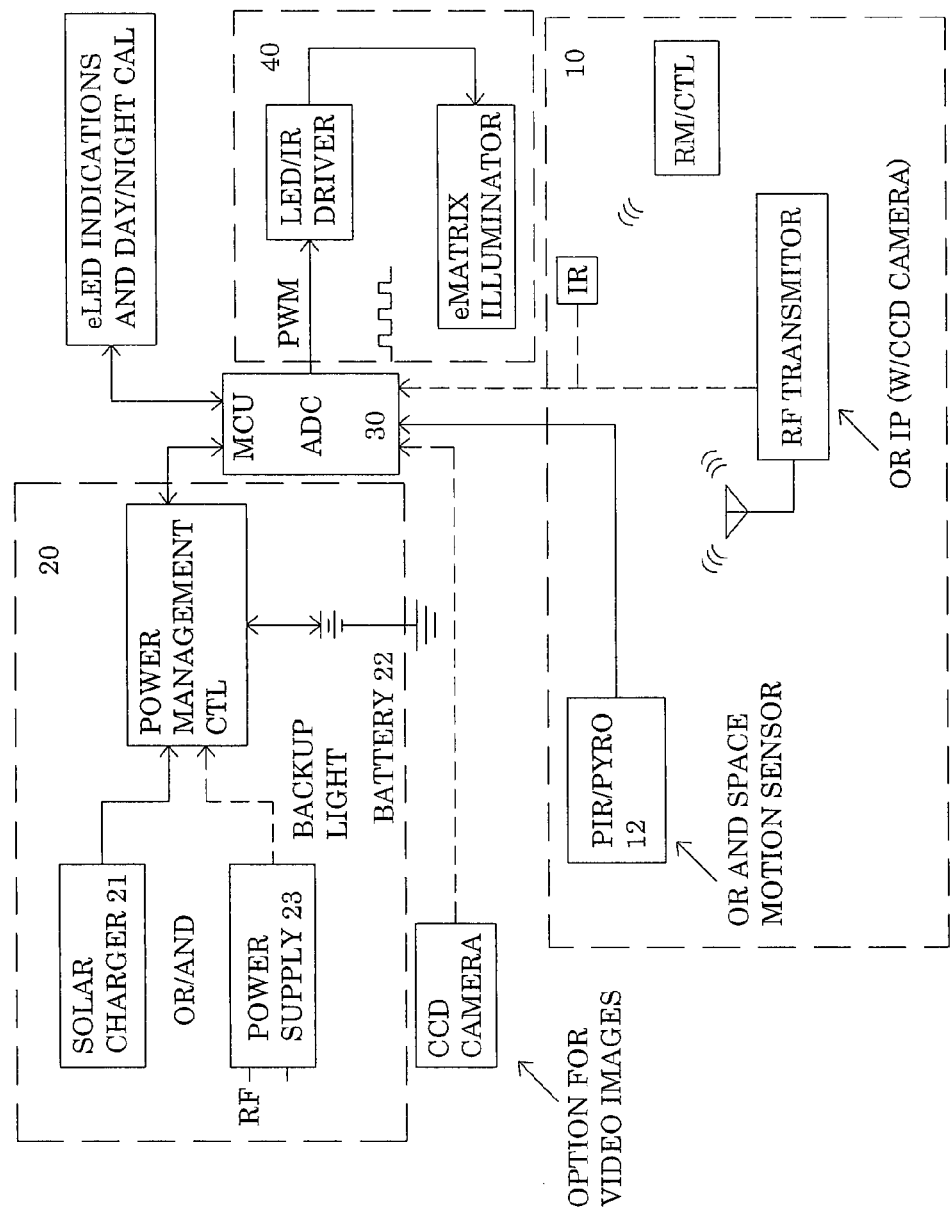
FIG. 3 is a block diagram of the system of energy saving lighting according to the above preferred embodiment of the present invention.

According to the present invention, referring to FIG. 3, the system of power saving lighting comprises a power supply component 20 supplying electricity to said system, wherein further comprises a solar power supply element 21, a rechargeable battery element 22, and/or an AC power supply element 23.

The solar power supply element 21 converts sunlight into electricity for power supply and battery charging. Solar power is a clean power which produces no wastes and pollution. It is now widely applied as a green power with the development of the solar cell technology. Naturally, the energy generation of solar power supply element 21 heavily depends on time and weather.

Figure 4A:
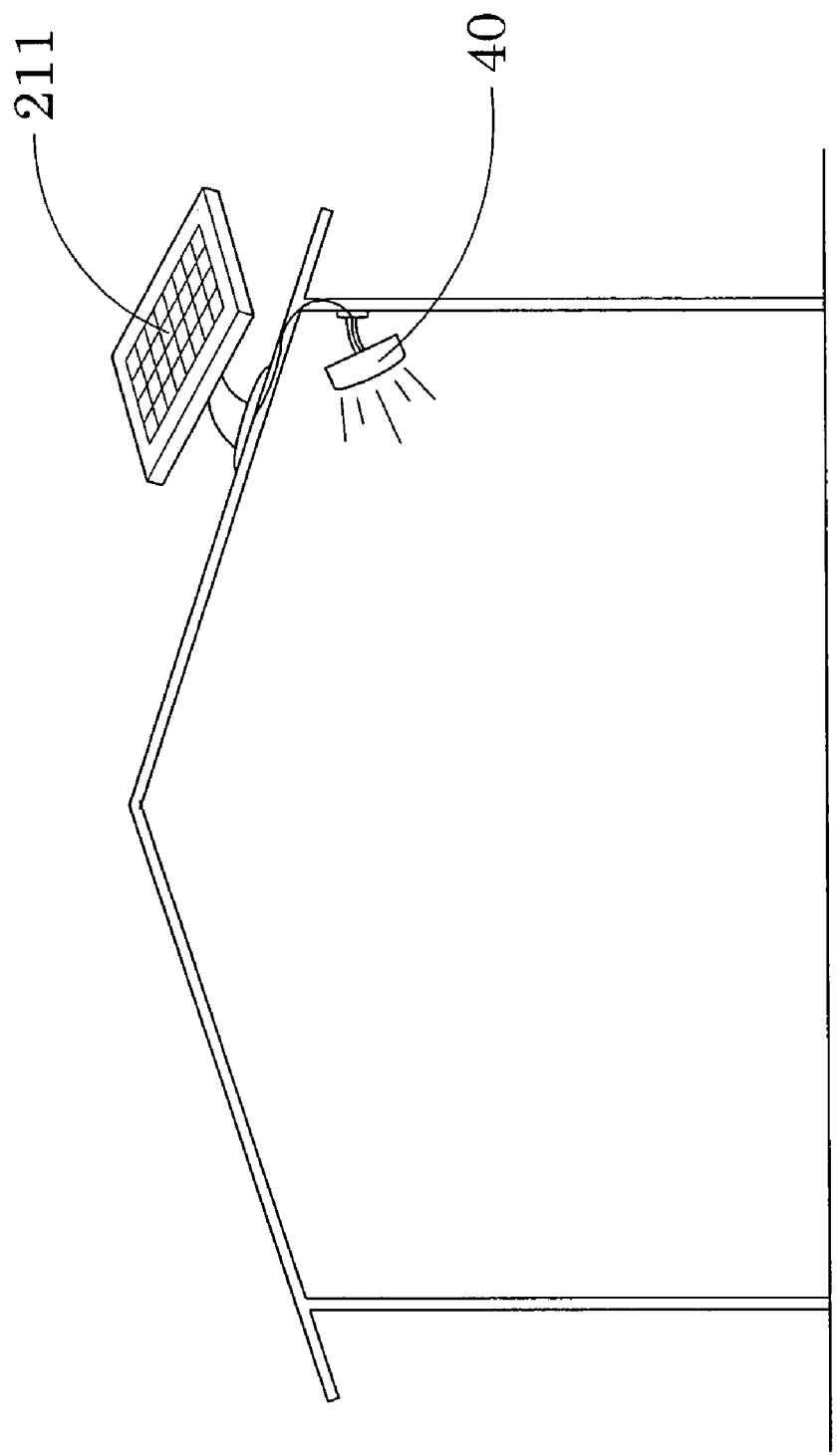
FIG. 4A is a perspective view illustrating the installation of the system of energy saving lighting according to the above preferred embodiment of the present invention.
Figure 4B:
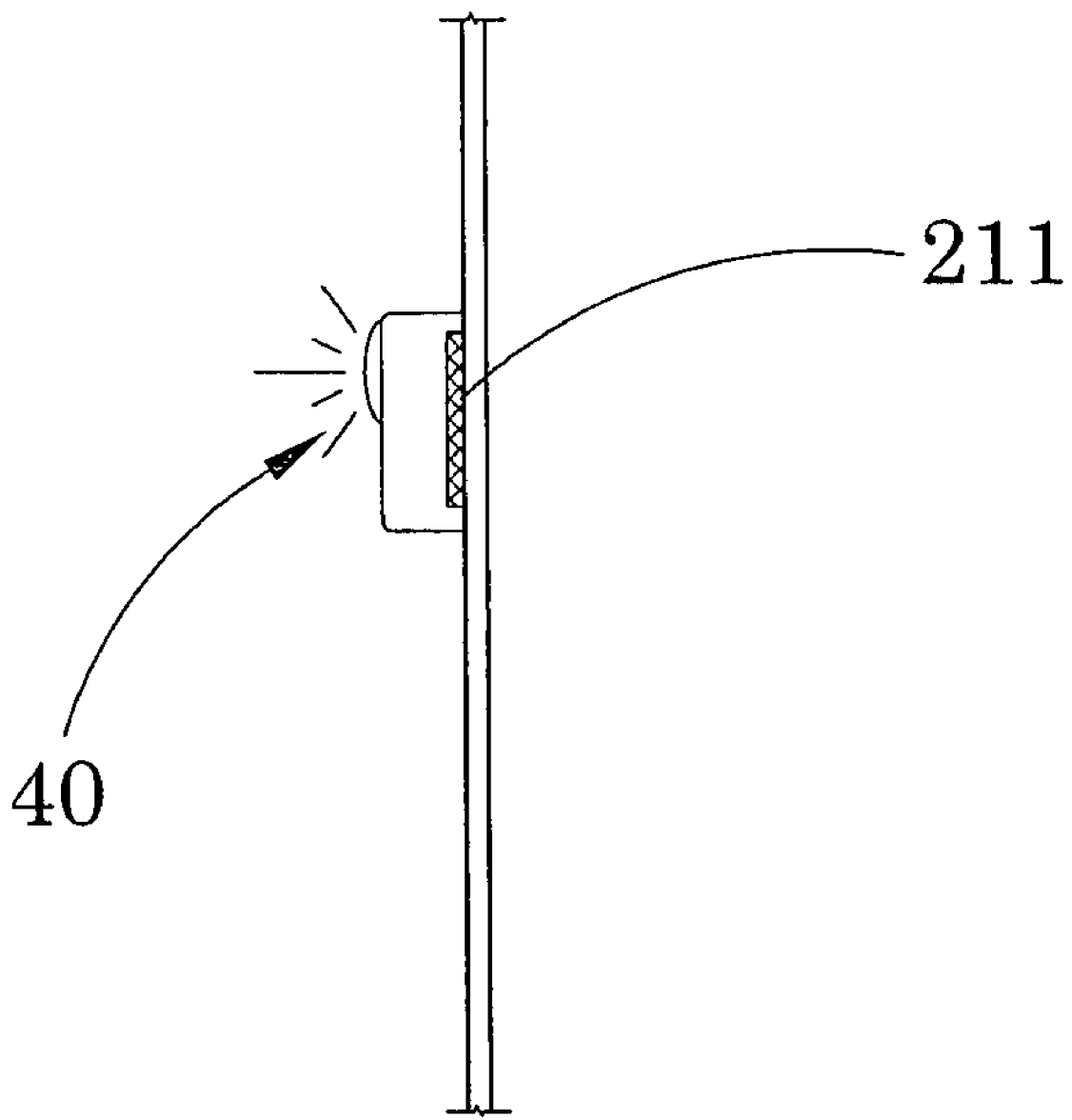
FIG. 4B is a perspective view illustrating the system of energy saving lighting wherein a solar panel is attached to the glass of a window according to a preferred embodiment of the present invention.

Referring to FIG. 4A, the solar power supply element 21 comprises a solar panel 211 which absorb the sunlight or any sort of light to generate electricity. The solar panel is electrically connected with the lighting system and can be placed under the condition with sufficient light remote to the lighting system. In a preferred embodiment, the solar panel 211 of the solar power supply element 21 in the present invention is places next to the window inside the room. Alternatively, referring to FIG. 4B the solar panel 211 is placed outdoor, for example, on the roof or the wall of a building.

Referring to FIG. 2, the rechargeable battery element 22 is used to supplement the solar power supply element 21. The rechargeable battery element 22 stores extra electricity energy when the power supply is sufficient, and provide electricity when there is no other power supply.

The rechargeable battery element 22 further comprises a rechargeable battery 221 which is electrically connected with the lighting component to supply power when it is selected, and a charging/discharging unit 222 which is electrically connected with the rechargeable battery 221 and the power supply component 20 for charging and discharging the rechargeable battery 221 wherein the charger is controlled by the microcontroller 30.

There are many different kinds of rechargeable batteries can be used in the present invention. In a preferred embodiment, the Lithium-polymer (Li-Poly) battery is used. Li-Poly is environmental protection battery. It is safe and has high energy density, long cycle life, and no poison.

The working efficiency and cycle life of the rechargeable battery 221 highly depends on the manner of charging and discharging. For different kinds of rechargeable batteries, there are many charging methods to optimize the power efficiency, to guarantee the safety, and to enlarge the life time of the batteries. In the present invention, the microcontroller 30 is used to control the charging and discharging of the rechargeable batteries. Referring to FIG. 3, the power supply component 20 is used as the charging source for the charger. The microcontroller 30 controls the charging time, charging voltage, charging method, and charging termination of the charger for charging the rechargeable battery 221.

In a preferred embodiment of the present invention, the charger is using pulsed charge method to charge the rechargeable battery 221 which feeds the charge current to the battery in pulses. The microcontroller 30 controls the charging rate by varying the width of the pulses. Preferably the width is around 1 second. During the charging process, short rest periods, preferably 20 to 30 milliseconds, between pulses allow the chemical actions in the battery to stabilise by equalising the reaction throughout the bulk of the electrode before recommencing the charge. This enables the chemical reaction to keep pace with the rate of inputting the electrical energy. This method can reduce unwanted chemical reactions at the electrode surface such as gas formation, crystal growth and passivation. During the rest period, the sensor component 10 measures the open circuit voltage of the battery and informs the microcontroller 30, then the microcontroller 30 decides the voltage and width of the next pulse, or terminates the charging.

Once a battery is fully charged, the charging current has to be dissipated. Otherwise the heat and gasses generated are bad for batteries. The sensor component 10 is able to detect when the reconstitution of the active chemicals is complete and the microcontroller 30 is able to stop the charging process before any damage is done while at all times maintaining the cell temperature within its safe limits. Detecting this cut off point and terminating the charge is critical in preserving battery life. In the preferred embodiment a predetermined upper voltage limit is set for the microcontroller 30 to decide to terminate the charging.

Battery discharging is also controlled by the microcontroller 30 to optimize the using of battery electricity, and prolong the life time of the battery. Overdischarging the batteries, or taking the cells below the recommended voltage will result in reduced cycle life. The microcontroller 30 monitors the condition of the battery during discharging. Once the depth of discharge reaches a predetermined level, and both solar power and AC power are not available, the microcontroller 30 will lower the brightness of the light component 40 regarding the particular application of the lighting system, to reduce the rate of battery discharging. When the depth of discharging reaches a predetermined deep level and no alternative power supply is available, regarding the particular application of the lighting system, the microcontroller 30 can shut down the light component 40 to avoid overdischarging.

The AC power supply element 23 is an option in a preferred embodiment of the present invention. If selected, the AC power supply element 23 is electrically connected with the civil power supply network which is used when there is no enough solar power and/or when the electricity of the rechargeable battery 221 is low.

Figure 4C:
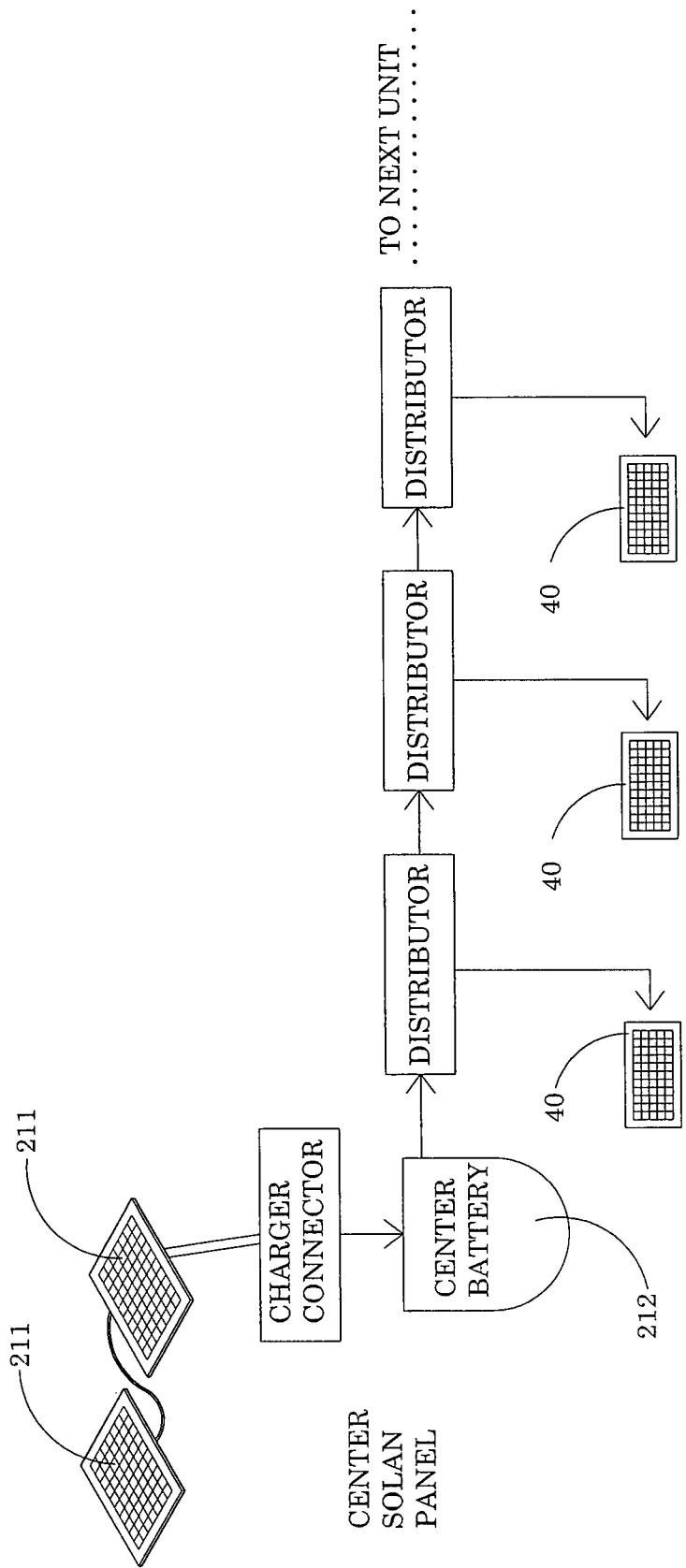
FIG. 4C is a schematic view illustrating a center power supply component supplying energy to distributed light components of the system of energy saving lighting according to a preferred embodiment of the present invention.

In a preferred embodiment of the present invention, the system of power saving lighting comprises one center power supply component 20, and multiple light components 40. Referring to FIG. 4C, in an alternative embodiment, the center power supply component 20 comprises a large solar panel 211 and a rechargeable battery 221 with large capacity to supply power to the whole system. The center power supply component 20 can be located in place where can most efficiently absorb solar energy. The multiple light components 40 are distributed in different locations and are all electrically connected with the center power supply component 20 to get power supply.

Figure 4D:
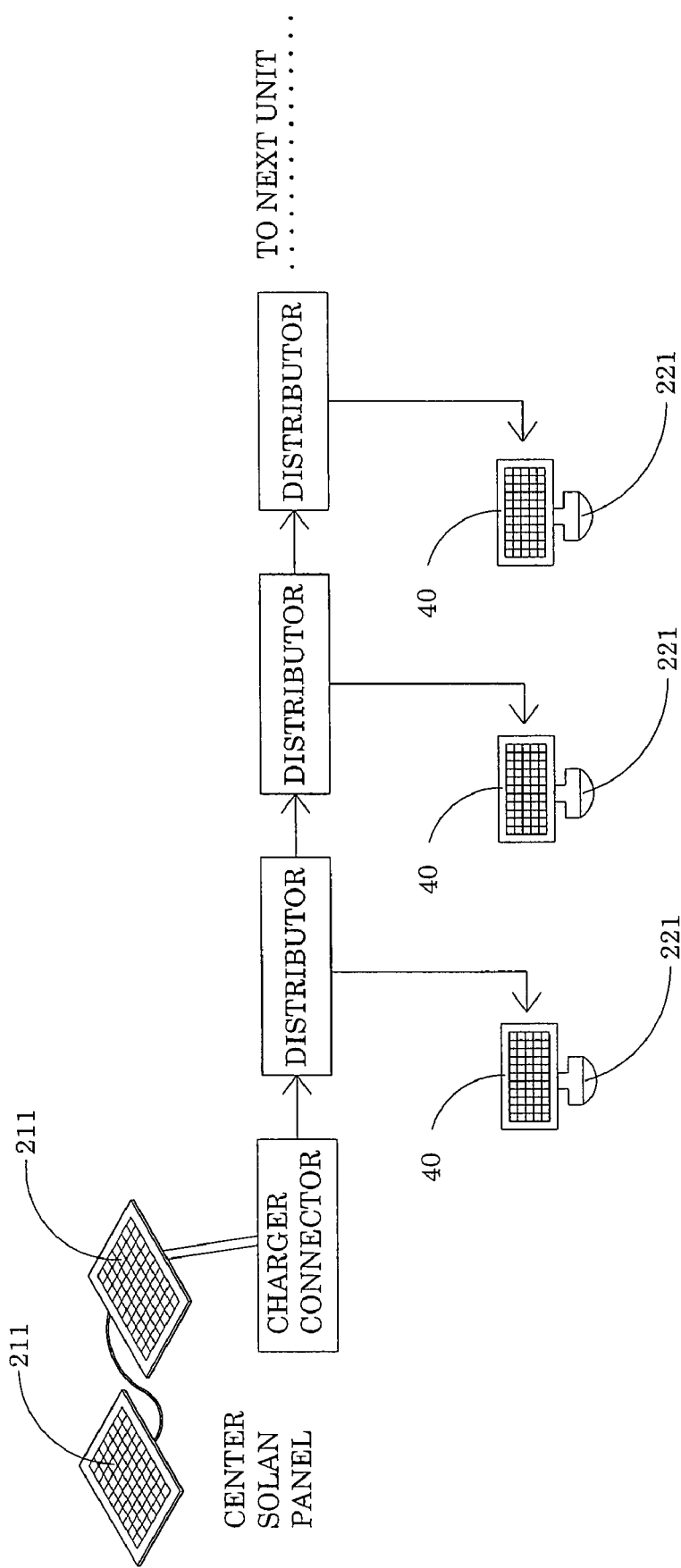
FIG. 4D is a schematic view illustrating a central solar power supply element supplying electricity to distributed light components of the system of energy saving lighting according to a preferred embodiment of the present invention, wherein each light component is electrically connected with a rechargeable battery.

In another alternative embodiment, referring to FIG. 4D, the center power supply component 20 comprises a large solar panel 211 and multiple rechargeable batteries with relatively smaller capacity. These rechargeable batteries are located with the multiple light components 20 and are electrically connected with said light components. In this embodiment, the solar panel 211 can be located in place with most sufficient solar power, and the rechargeable batteries 221 are distributed with the light components 20.

The power supply component 20 is monitored by the sensor component 10 and is controlled by the microcontroller 30. The microcontroller 30 switches the power source for the system to use the energy most efficiently. When there is sufficient sun light, the solar power supply element 21 is selected by the microcontroller 30 to supply the power for the lighting component and charging the battery. When there is no sufficient solar energy, the battery will be discharged for power supply. The AC power supply element 23 is used when there is lack of solar energy and the battery level is low.

According to the present invention, the system of power saving lighting comprises a sensor component 10 which monitors the environment and the conditions of the system to provide reference information for the microcontroller 30. Referring to FIG. 3, the sensor component 10 comprises: an energy sensor 12 which is a motion detector can detect people or other object's activity or movement wherein the information can help the microcontroller 30 to decide if illumination is needed; a battery monitor unit 11 which monitors the conditions of the rechargeable battery 221; and a light sensor 13 which measures the amount of light in the predetermined area and feeds the information to the microcontroller 30 to calculate the brightness of the lighting component to output.

The motion detector is a kind of energy signal detection device to detect motions such as human activities in the detection area. When this kind of movement is detected, the motion detector informs the microcontroller 30. Also considering the amount of light sensed by the light sensor, the microcontroller 30 will determine if the lighting component should be switched on.

Figure 5:
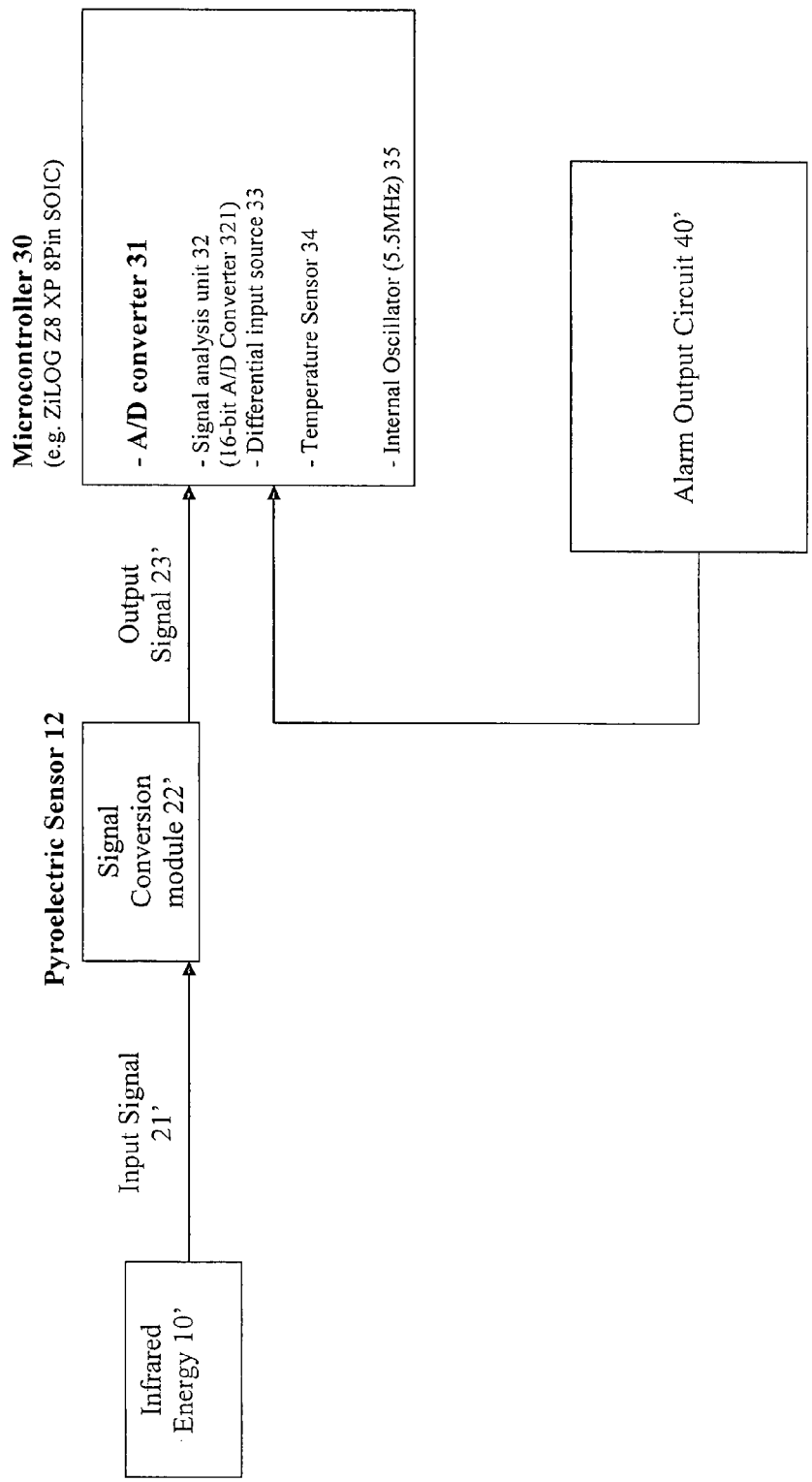
FIG. 5 is a block diagram of a system of energy signal detection according to a preferred embodiment of the present invention.

Referring to FIG. 5, the present invention utilizes a process and system of motion detection, which improves sensitivity, performance and reliability thereof and reduces false alarms by distinguishing between noise and real signals. The motion detector comprises an energy sensor 12 which is electrically connected to the microcontroller 30 wherein the energy sensor is adapted for defining a detecting area and detecting energy directed there within to produce inputted energy signals.

According to the preferred embodiment of the present invention, the energy sensor is embodied as a pyroelectric sensor which is a pyroelectric sensing element adapted for sensing energy radiation, i.e. the infrared energy according to the preferred embodiment, within a detecting area. The pyroelectric sensor is passive and has two or more detecting elements for detecting energy, wherein a signal will be emitted when a difference exists in the energy being detected between the individual elements.

The infrared energy is directed onto the pyroelectric sensor, wherein the infrared radiation as an input signal is converted into an output signal through a signal conversion module of the pyroelectric sensor, wherein the output signals generally contain real signals with low frequency and noise signals mixed therewith.

These inputted energy signals generally contain real signals with low frequency and noise signals mixed therewith. Conventionally, only the real signals are desired. In order to increase the sensitivity and reduce the false alarms, filters with different pass bands are used to pick signals within the most efficient band of frequencies. At the same time, the strength of the filtered signals is largely reduced so amplifiers are needed to strengthen the level of the signals for further processing. These steps tremendously diminish and distort the usable information carried by the original signals. As a result, false decision is easily to be made by the following signal processing elements.

Figure 6:
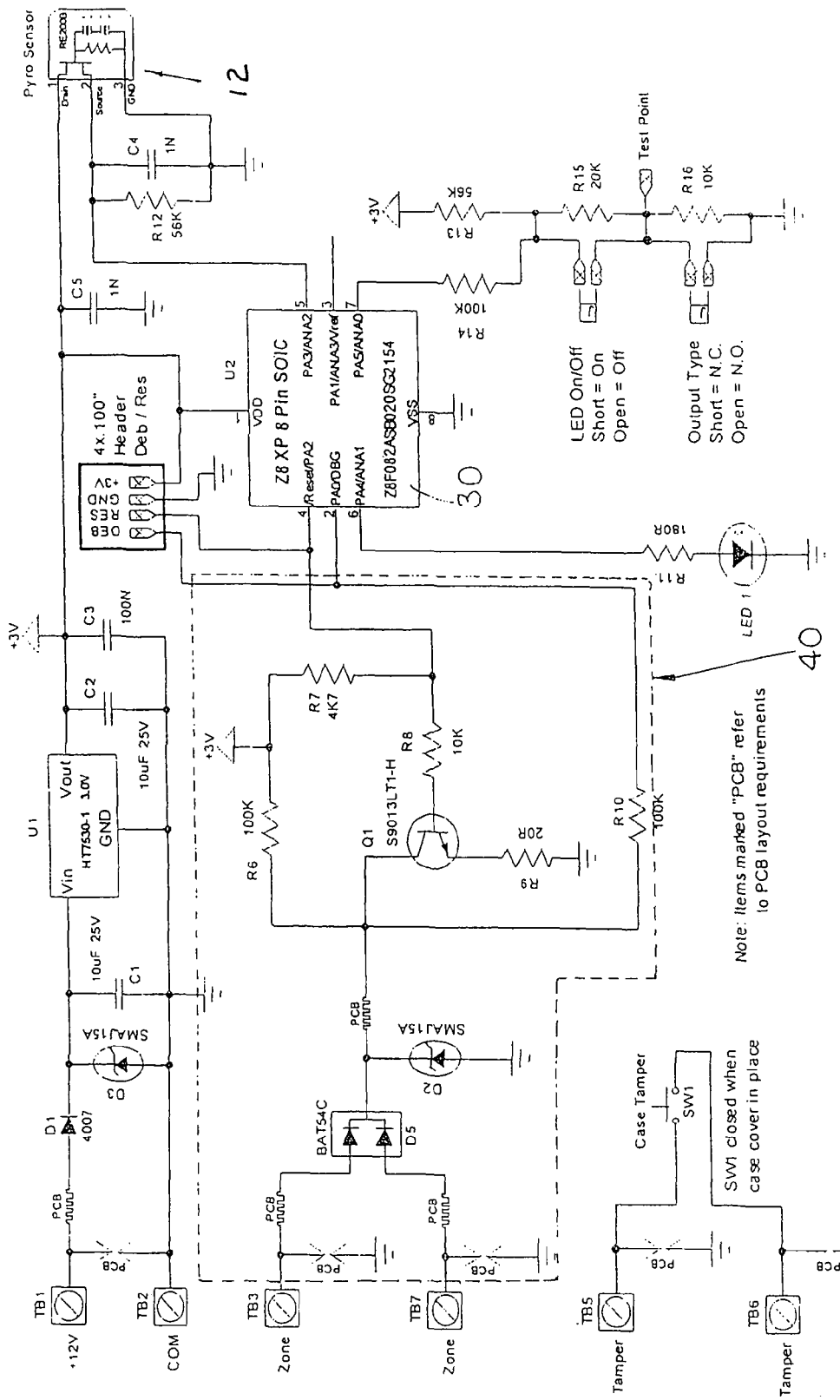
FIG. 6 is a circuit diagram of the energy signal detection system according to the above preferred embodiment of the present invention.

According to the present invention, the inputted energy signals are directly fed to the microcontroller 30 without being processed. Referring to FIG. 6, in hardware realization, the energy sensor 12 is electrically connected with the pins of the microcontroller 30 directly, without connecting with other electrical elements, such as filter and amplifier. So that the inputted energy signals fed into the microcontroller 30 contain the entire information generated by the energy sensor 12.

The microcontroller 30 comprises an analog-to-digital converter (A/D converter or ADC) to convert the inputted energy signals into data samples, wherein a plurality of data samples are averaged to form a predetermined number of constructed sample windows of constructed samples in time, wherein a control range is determined for each of the constructed sample windows, and thus by comparing relationships between the successive constructed sample windows, the microcontroller 30 is capable of determining whether to switch on the light.

According to the present invention, the process of energy signal detection comprises the following steps:

(a') Collect and receive a plurality of data samples converted from the A/D converter of the microcontroller and generate a predetermined number of constructed sample windows of constructed samples in time.

(b') Determine a control range for each of the constructed sample windows.

(c') Determine whether there is an active condition by comparing relationships between successive constructed sample windows.

(d') Generate an output signal when the active condition is qualified.

The step (a') further comprises the steps of:

(a'1) acquiring data samples from the A/D converter;

(a'2) constructing a predetermined number of raw data samples to create a single constructed sample; and (a'3) buffering a predetermined number of constructed samples to form one or more constructed sample windows in time.

In the step (a'2), the raw data samples are statistically processed with time. The constructed sample is constructed from the group of raw data samples for the purpose of removing noise and increasing resolution.

According to the preferred embodiment, a plurality of raw data samples is averaged to form a single constructed sample. In other words, none of the conversion signals will be individually taken as accurate measurement. According to the preferred embodiment of the present invention, for example, 18 raw data samples are averaged to form a single constructed sample. It should be noticed that when 4 data samples are averaged to generate the constructed sample, it gives another 1 bit input resolution, and that when 16 data samples are averaged to generate the constructed sample, it gives another 2 bits input resolution. Therefore, the averaging of the data samples into constructed samples further enhances the input resolution for 2 more bits and thus rendering the input resolution of the energy detection system and process of the present invention from 11 bits to 13 bits.

In the step (a'3), according to the preferred embodiment of the present invention, since all data samples converted from the output signals from the pyroelectric sensor are treated and averaged into constructed samples for data processing, noise is treated as part of the signals too. Thus, these signals which contain a noise component as well as signal data should be treated and analyzed in a control range manner. The calculation of the control range of a constructed sample window in time comprises a predetermined number of successive constructed samples, for example 26.

Figure 9A:
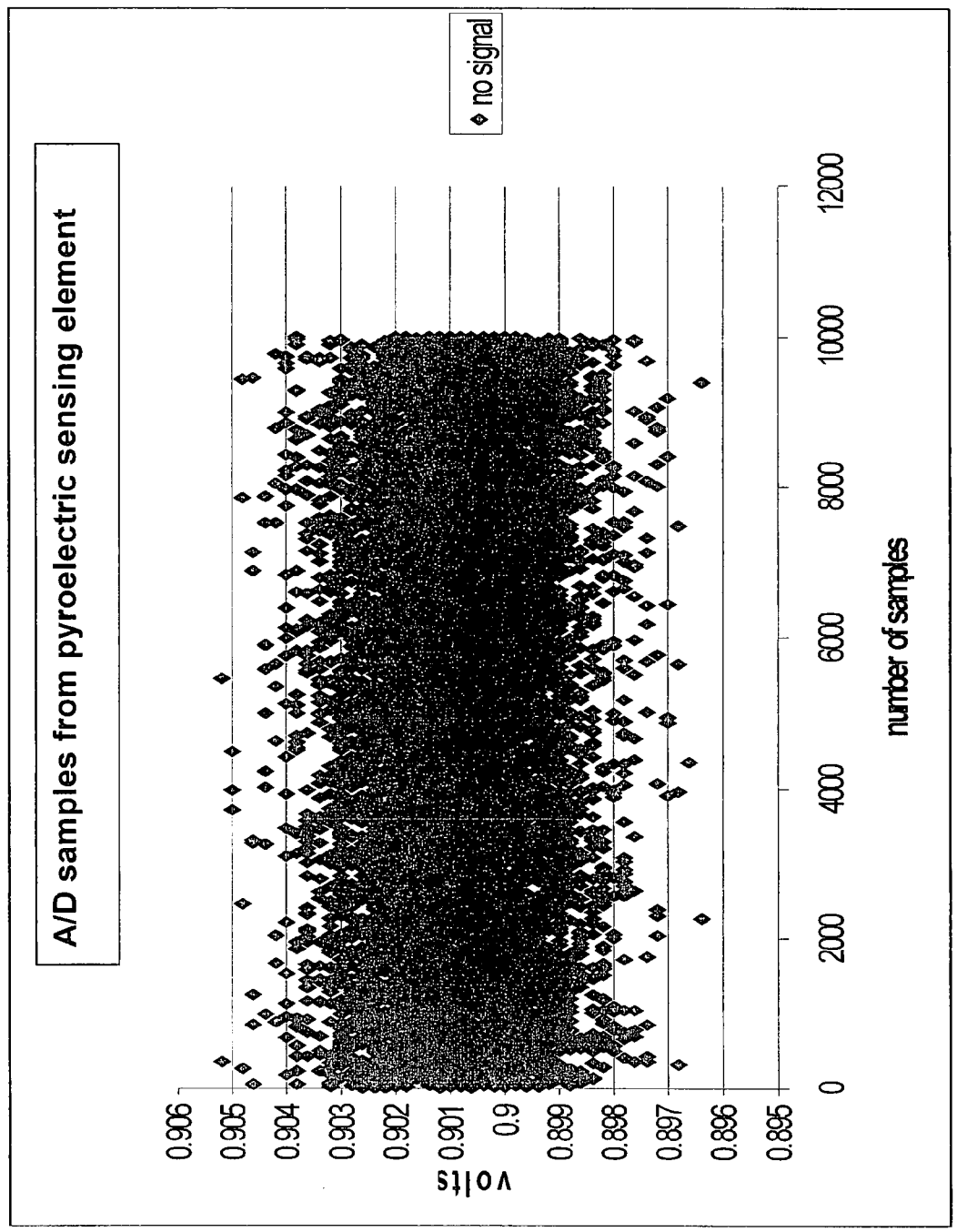
FIG. 9A is a chart illustrating A/D samples from pyroelectric sensing element when there is no signal according to the above preferred embodiment of the present invention.
Figure 9B:
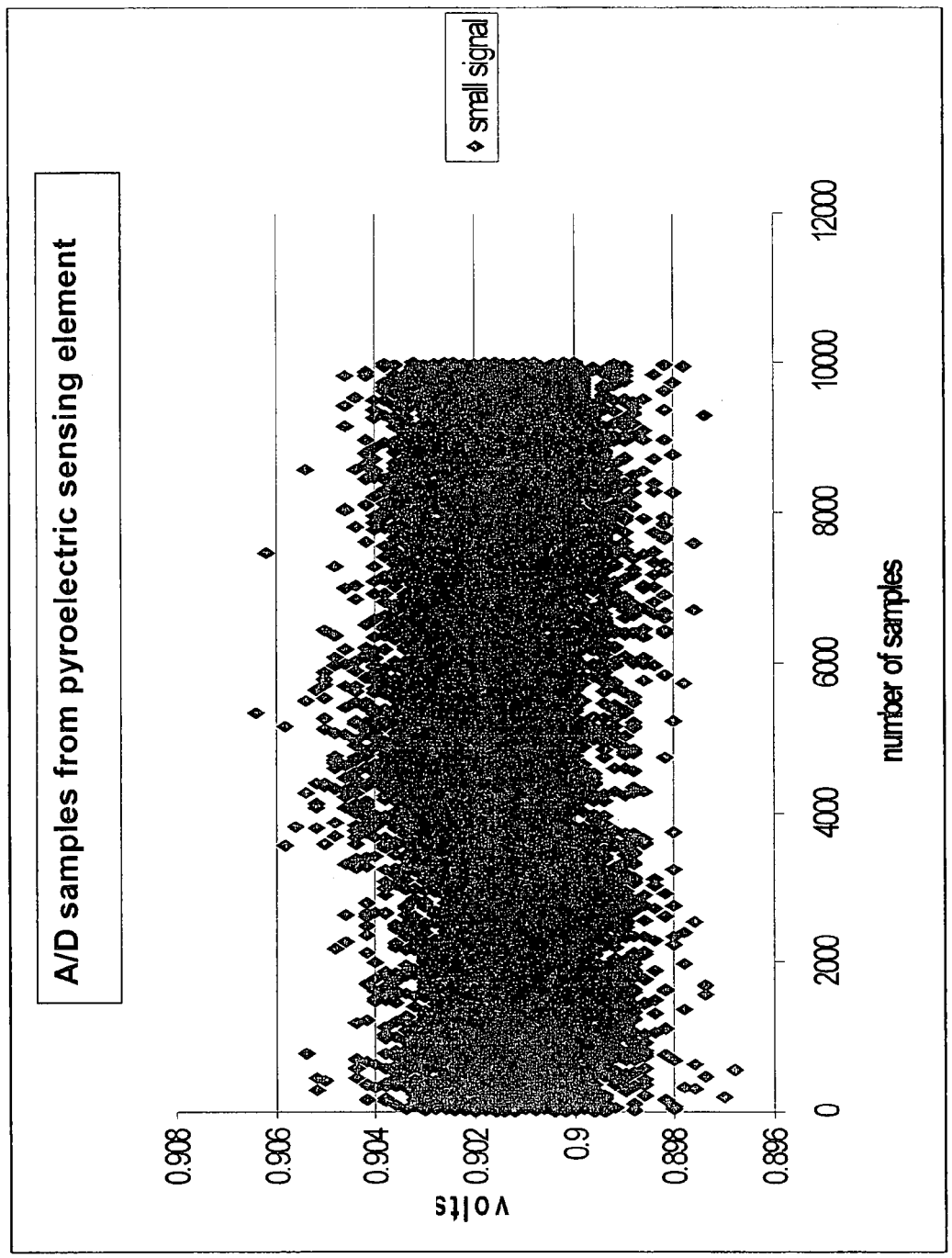
FIG. 9B is a chart illustrating A/D samples from pyroelectric sensing element when there is small signal according to the above preferred embodiment of the present invention.

Referring to FIGS. 9A and 9B, if the data samples, including real signals and noise, are analyzed, it is found that it is normally distributed. With normally distributed data, a textbook shortcut can be used to calculate the standard deviation. It is appreciated that 68.26% of the data will fall within 1 standard deviation of the mean, 95.46% of the data will be within 2 standard deviations, and 99.73% will fall within 3 standard deviations. In other words, by means of three standard deviations, 99.73% of all the constructed samples are expected to fall within the control range of the respective constructed sample window.

One such rigid characteristic is that 99.73% of the data that make up a normal distribution falls within standard deviations of the average. In practice, it is assumed that all data points plotted should fall within the three standard deviation limits, i.e. Upper Control Limit (UCL) and Lower Control Limit (LCL). This appears reasonable given the very low incidence of data points falling outside the UCL and LCL in a normal distribution (3 in 1000).

In the step (a'3), the prerequisite factors for calculating the control range are determined from each constructed sample window. These factors are, the constructed sample window range, i.e. constructed sample maximum (MAX)−constructed sample minimum (MIN), and the constructed sample window average (AVE), i.e. sum of constructed samples divided by number of constructed samples.

In the step (b'), in order to determine the control range of each of the constructed sample windows, the UCL and LCL of each of the constructed sample windows can be computed by taking the constructed sample window average (AVE) and adding/subtracting the constructed sample range multiplied by an A2 factor, wherein the A2 factor is a coefficient that is based on the size of the constructed sample window, i.e. the number of constructed sample being put together in that constructed sample window. It only works for normally distributed data. In other words, the A2 factor is an efficient and quick method for calculating the standard derivations, for example 3 standard derivations. It can only be used with the distribution of the data is normal distributed (i.e. Gaussian/Bell Curve). The A2 factor of a constructed sample window size of 20 is 0.16757. The formula for computing the A2 factor is "A2 Factor=1.7621 (constructed sample window size) to the exponent of (−0.7854)".

Figure 10:
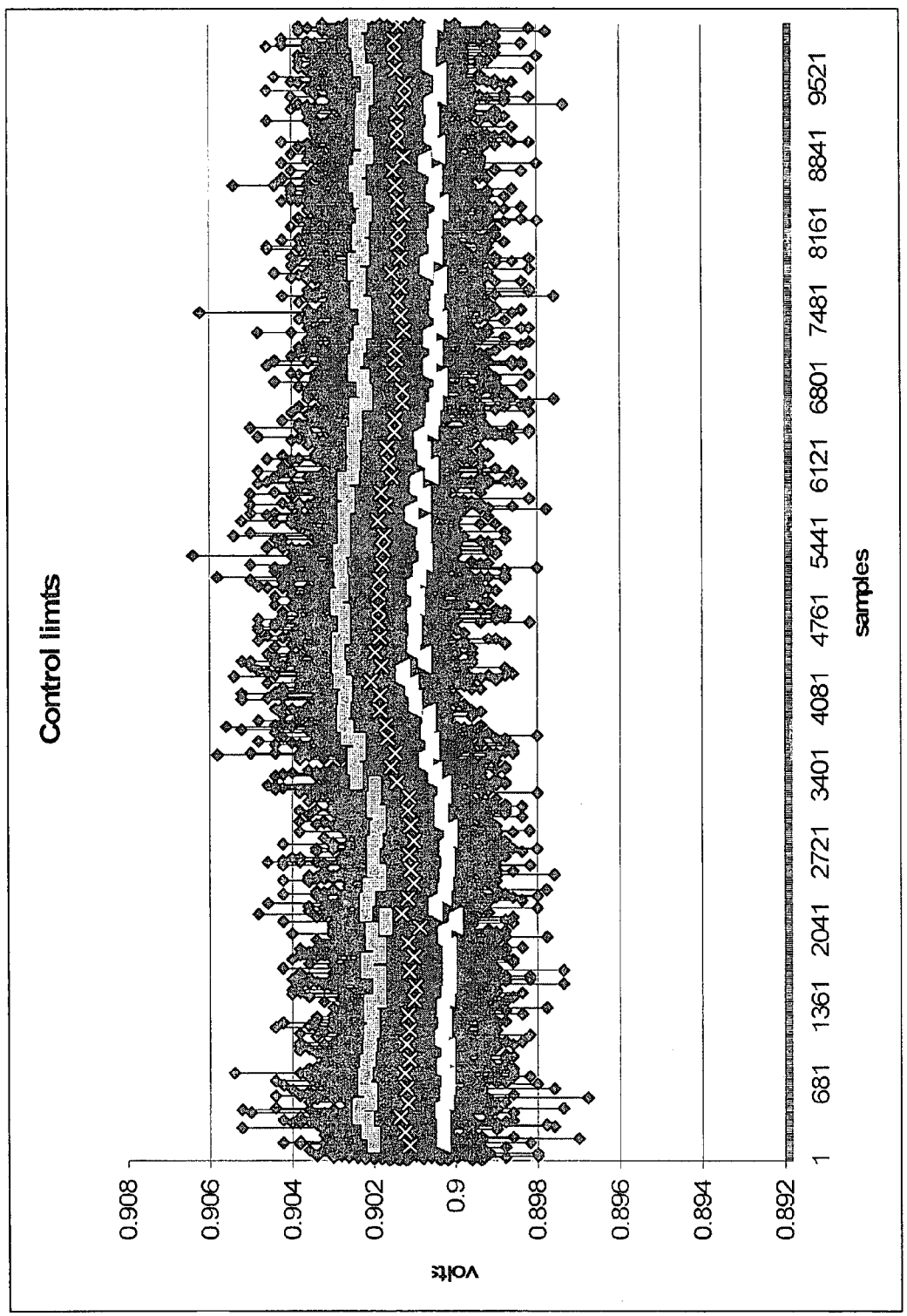
FIG. 10 is a chart illustrating the Upper and Lower Control Limits of the present invention according to the above preferred embodiment of the present invention.
Figure 11:
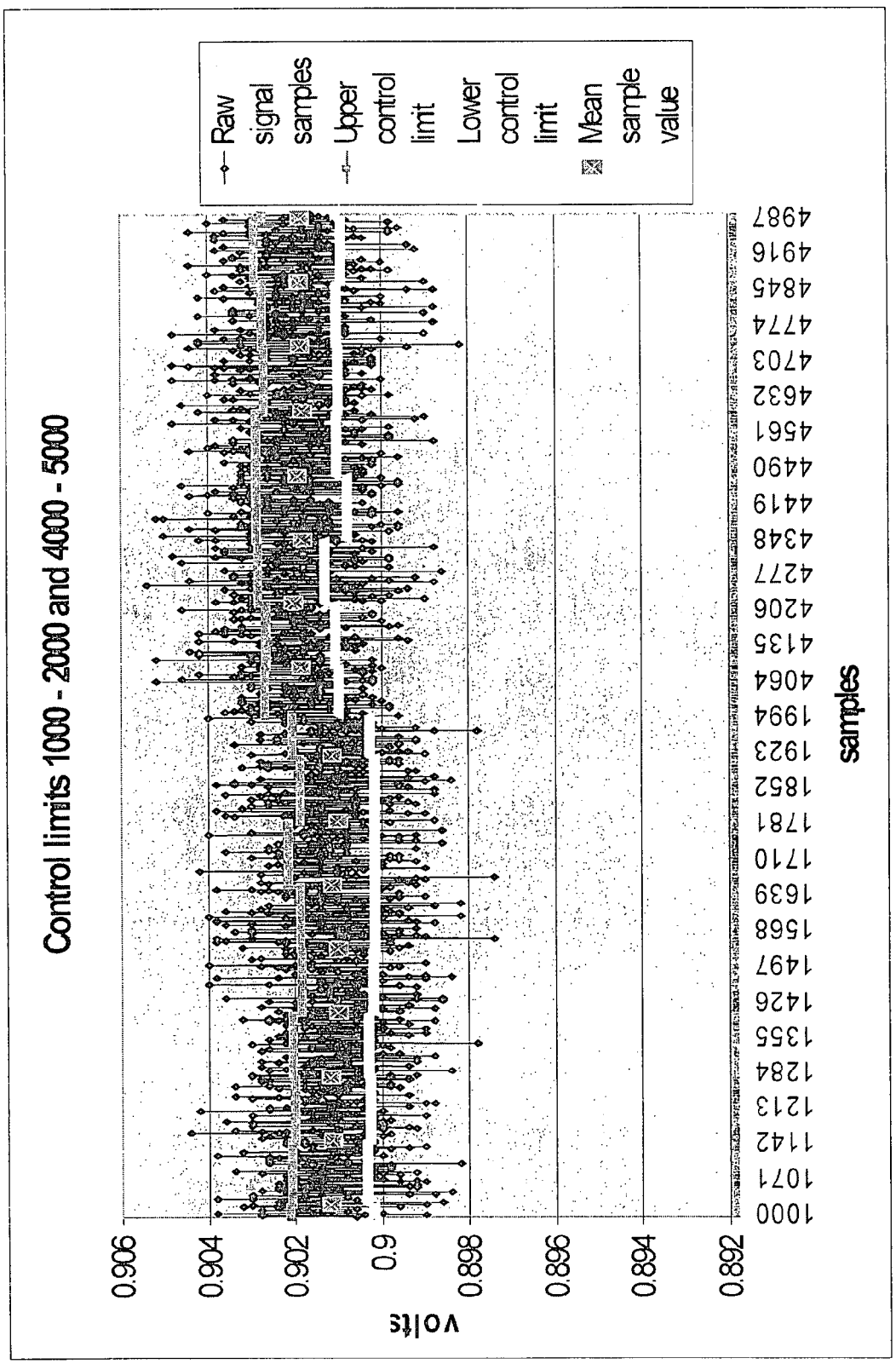
FIG. 11 is a chart illustrating the 1000-2000 sample window and the 4000-5000 sample window according to the above preferred embodiment of the present invention.
Figure 12:
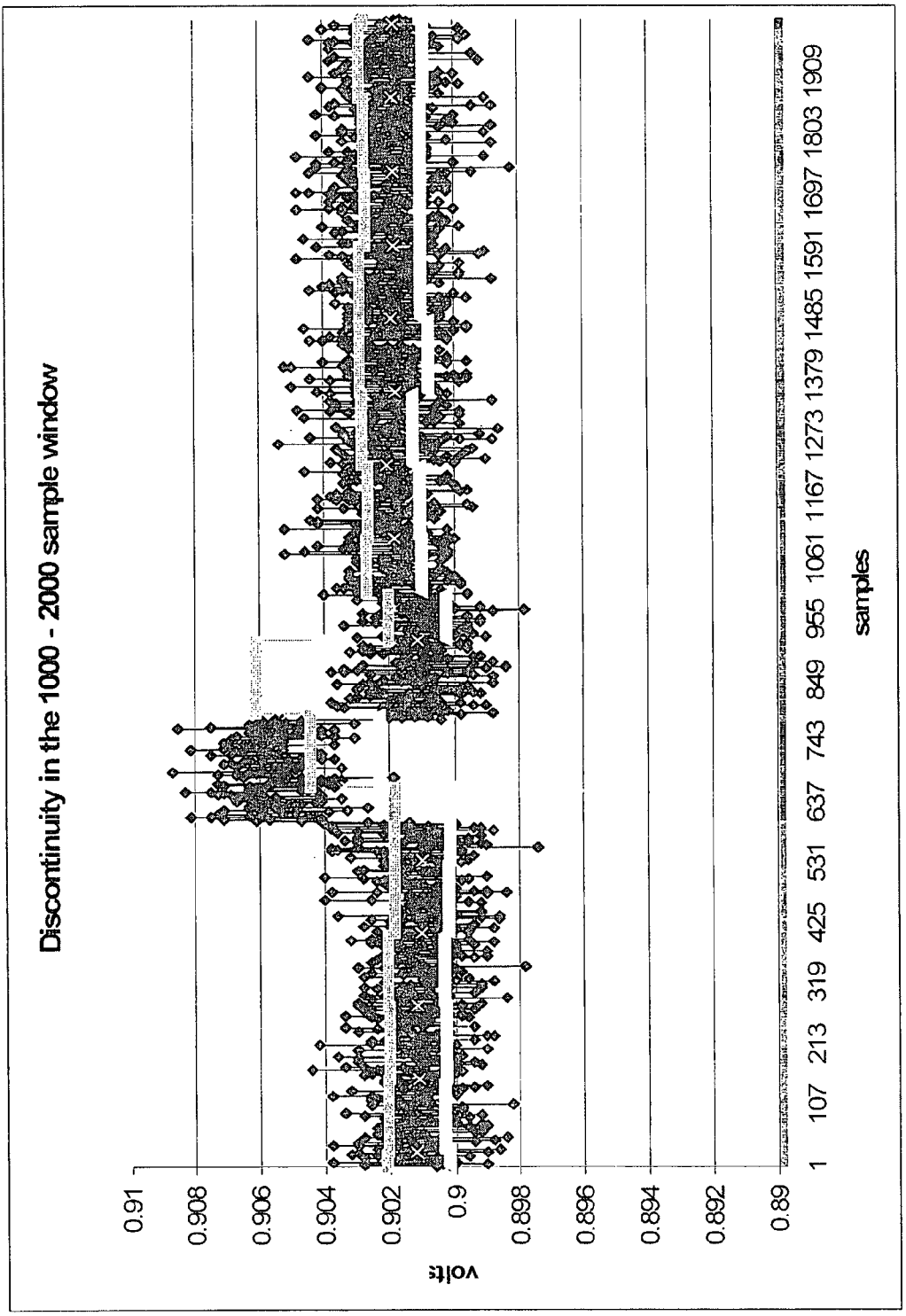
FIG. 12 is a chart illustrating discontinuity in the 1000-2000 sample window according to the above preferred embodiment of the present invention.

In other words, the decision of the active pre-condition is not based on the raw data samples or individual constructed sample data, but based on the Upper Control Limits and Lower Control Limits of the constructed sample windows, as shown in FIG. 10, wherein the UCL and LCL are calculation for each constructed sample window as follows:

$$UCL = AVE + A2 \times \text{Range}$$

$$LCL = AVE - A2 \times \text{Range}$$

In order to use the Upper and Lower Control Limits in real time, the present invention provides a plurality of control limits at differing time intervals, so that it can use said control limits (UCL/LCL) for comparing the relationships between the control limits (UCLs/LCLs) of two or more constructed sample windows to determine the active pre-condition. This requires the present invention to be able to buffer a fair amount of data, i.e. constructed samples. This is the reason that the raw data samples are normalized from floating point back to 8 bit data values. It is appreciated that the embodied microcontroller 30, i.e. the ZiLOG Z8 XP 8 Pin SOIC, has 1000 bytes of internal ram storage.

The step (c') further comprises the following steps:

(c'1) Group a predetermined number of successive constructed sample windows to form a window group for comparing the relationships between the successive constructed sample windows of the window group, wherein a space is formed between every two successive constructed sample windows. According to the preferred embodiment, four successive constructed sample windows are put together to form a window group and the space between the two successive constructed sample windows is preferred to be made of 1 to 2 constructed samples.

(c'2) Analyze any statistically significant change among the control limit ranges between their UCL and LCL of the constructed sample windows in the window group to distinguish between noise and real signals so as to determine whether there is an active pre-condition.

In the step (c'2), in order to have a significant active event, all the successive constructed sample windows in the window group must follow the same direction of trend change.

Figure 16A:
FIGS. 16A-C are diagrams illustrating various types of crossing between constructed sample windows in the window group according to the preferred embodiment of the present invention.
Figure 16B:
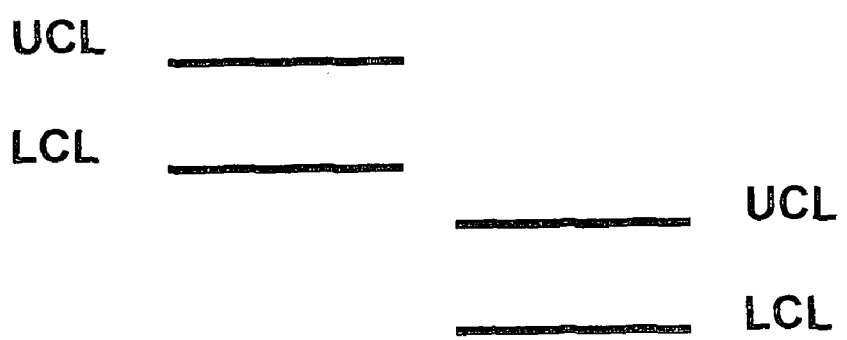
Figure 16C:

According to the present invention, crossing between two successive constructed sample windows means one of the UCL and LCL of one constructed sample window is compared with one of the complimentary control limit (UCL/LCL) of another previous or subsequent constructed sample window in a window group for variation, such as a less than crossing as shown in FIG. 16A, a greater than crossing as shown in FIG. 16B, a equal to crossing as shown in FIG. 16C, wherein the percentage of crossing can be ranging from 50% to 500%.

Figure 17A:
FIG. 17A is a diagram illustrating a no-crossing change of the constructed sample windows in a window group according to the preferred embodiment of the present invention.
Figure 17B:
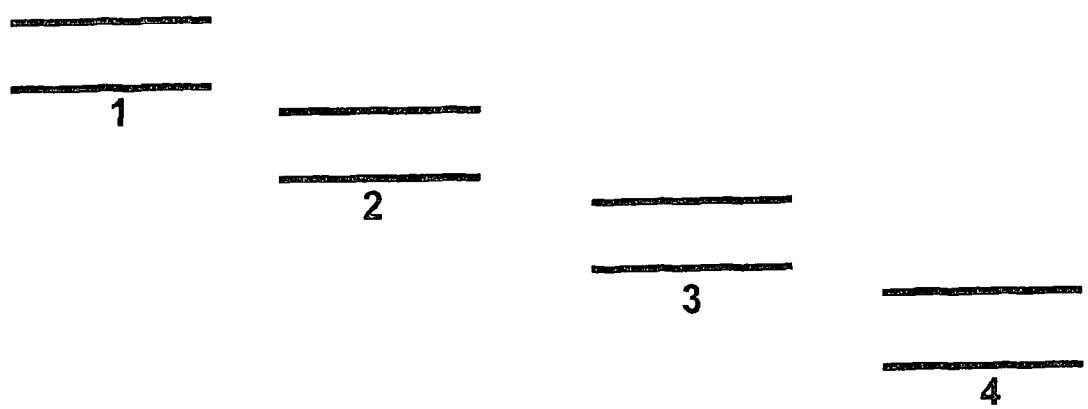
FIG. 17B is a diagram illustrating a crossing down change of the constructed sample windows in a window group according to the preferred embodiment of the present invention
Figure 17C:
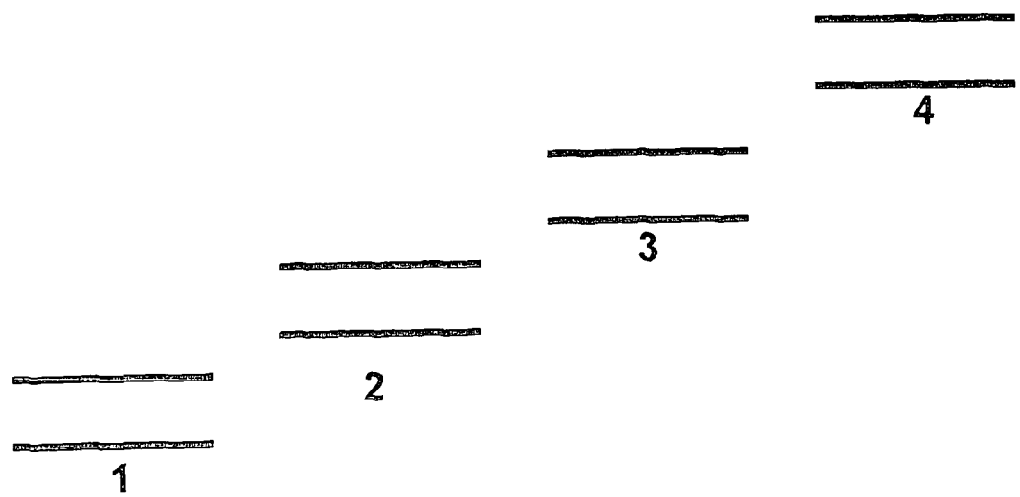
FIG. 17C is a diagram illustrating a crossing up change of the constructed sample windows in a window group according to the preferred embodiment of the present invention.
Figure 18A:
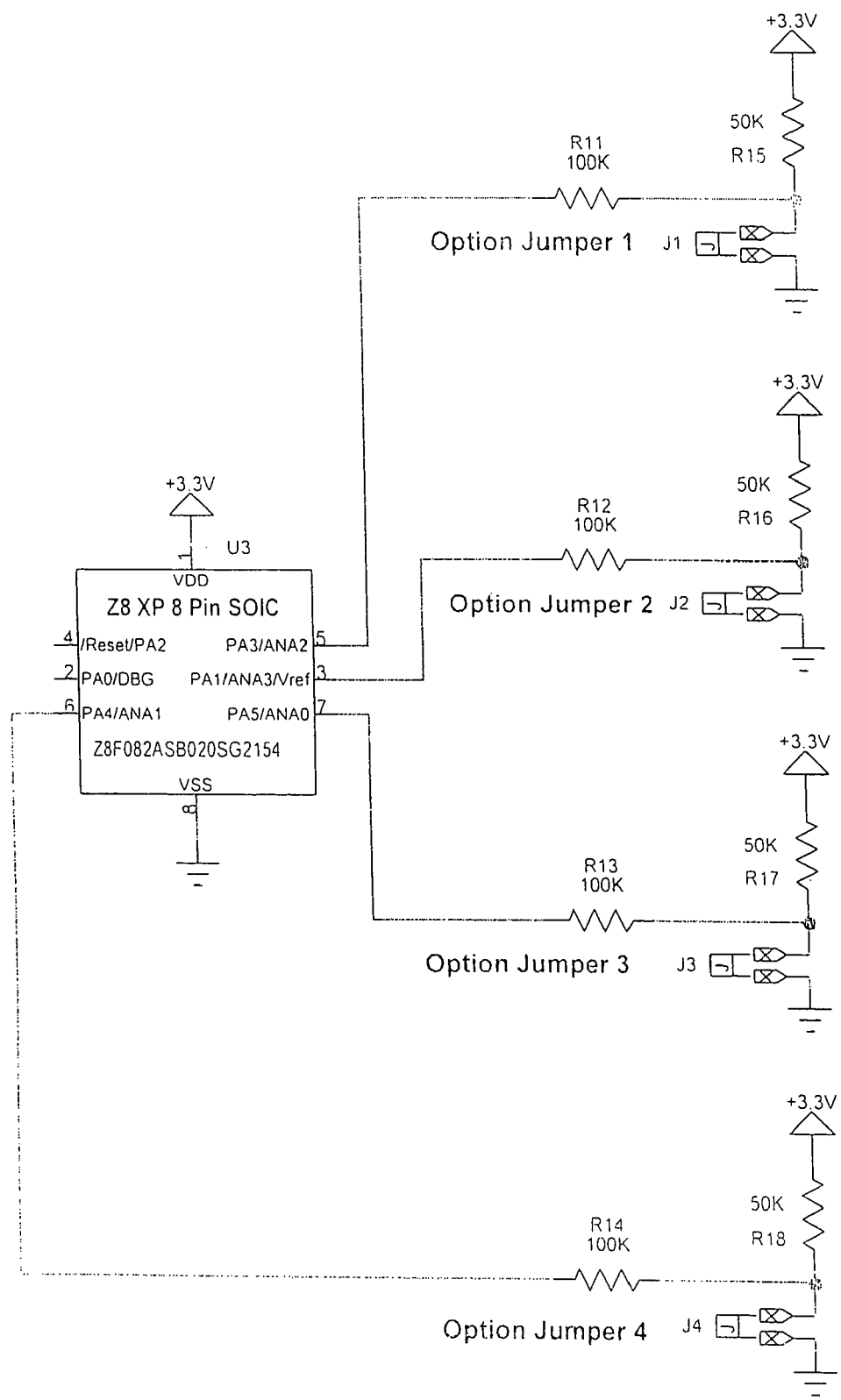
FIG. 18A is a circuit diagram illustrating a traditional jumper circuit.
Figure 18B:
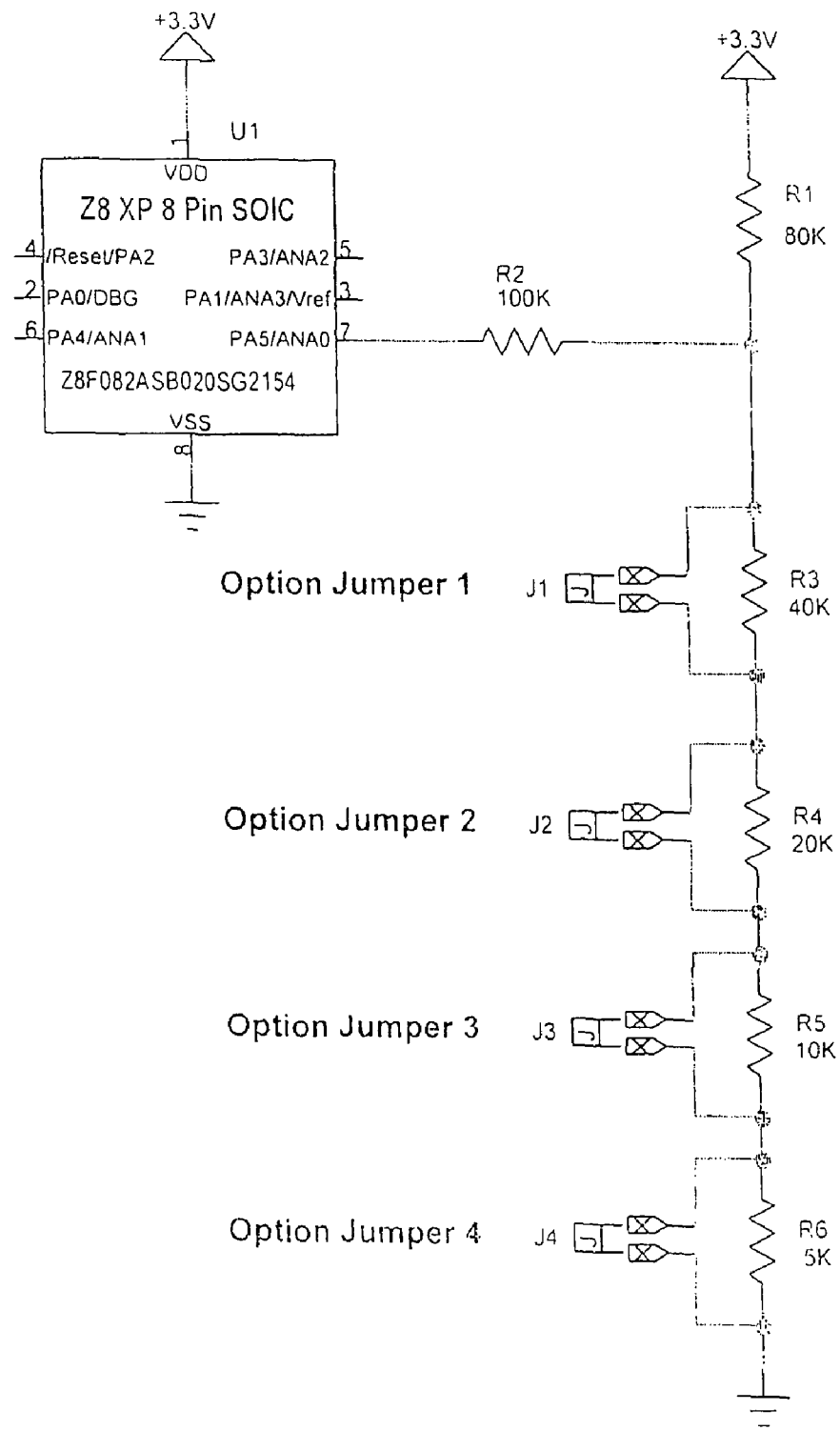
FIG. 18B is a circuit diagram illustrating a jumper tree circuit according to the above preferred embodiment of the present invention.
Figure 18C:
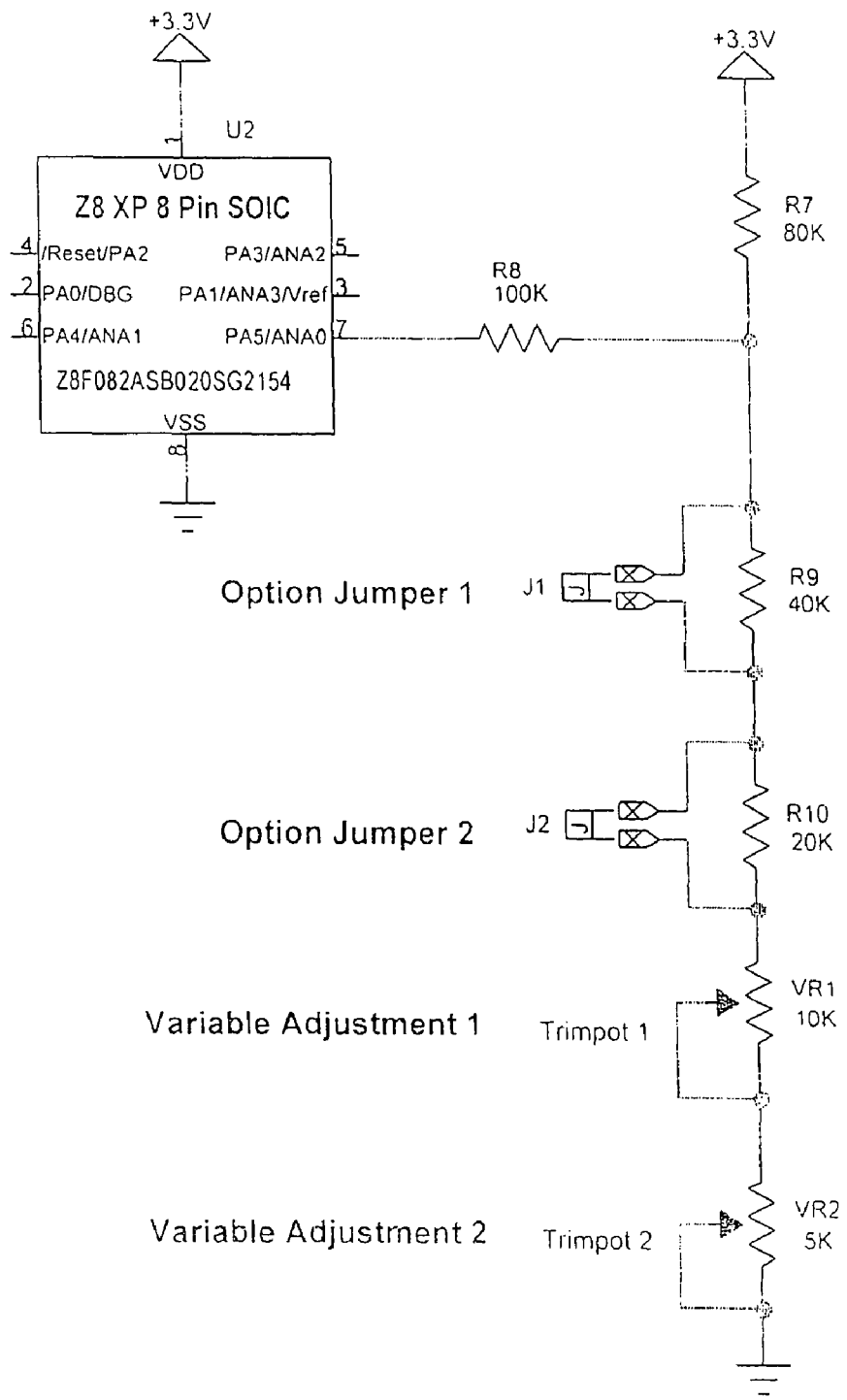
FIG. 18C is a circuit diagram illustrating an alternative mode of the jumper tree circuit according to the above embodiment of the present invention.

For example, as shown in FIG. 17A, when the constructed sample windows in the window group are in a row, no active pre-condition will be considered. When the constructed sample windows in the window group are either 1-4 crossing in a down trend as shown in FIG. 17B or crossing in an up trend as shown in FIG. 17C, it starts to qualify an active pre-condition.

After the step (c'2), the step (c') further comprises a step (c'3) of identifying the crossing among constructed sample windows in the window group to determine whether the active pre-condition is created by noise or real signals by means of the slope or trend of the constructed sample windows.

In the step (c'3), for normal energy signal detection, a first slope detection is processed. Depending on the size of the data buffer, a predetermined number of window groups is analyzed as buffering window groups at one time for sloping direction and the microcontroller 30 is statistically preset to determine an active condition when a first predetermined number of window groups out of the predetermined number of buffering window groups trend in the same direction, e.g. down trend or up trend. According to the preferred embodiment of the present invention, the data buffer can be fed with 100 or more constructed samples at any point of time, so that 24 buffering window groups are being analyzed and, at any point of time, at least 17 window groups, for example, out of the 24 buffering window groups must trend in the same direction, with no reverse trend while neutral trend being all right, in order to qualify the active pre-condition into an active condition. When any window group of the buffering window groups is not trending towards the same direction, said buffering window groups at that time are discarded.

It should be noted that if any reverse direction happens for any window group with the buffering window groups, it must be something wrong with the system and it reflects as no actual condition of the detecting area. Then, the process is reset.

For fast energy signal detection, a second slope detection is processed in the step (c'3) in addition to the first slope detection. Every time when a new constructed sample is fed into the data buffer, the microcontroller 30 recalculates all the conditions, including the slope response of the window groups and the control limits, to determine whether the down trend or up trend of the constructed sample windows is a fast trend.

When a fast trend is found, such as the condition that a person is running quickly across a PIR motion sensor (the energy signal detection system), a predetermined number of fast constructed sample windows is grouped, wherein each fast constructed sample window contains a predetermined number of successive constructed samples, for example four. According to the preferred embodiment of the present invention, for example, three fast constructed sample windows are required to form a fast window group for determining the slope trend, wherein each space between two successive fast constructed sample windows is made of 1 to 2 constructed samples.

In order for any fast window group to be considered, all fast constructed sample windows in the fast window group should be either in an up trend or a down trend manner. To determine whether there is an active pre-condition, according to preferred embodiment at least five successive fast window groups are sloping either in an up trend manner or a down trend manner to start a period measurement process.

When there are five or more fast window groups trending towards a direction within a certain predetermined time period, it is an illustration that there is a valid slope and the system will look for any complimentary slope within a qualified time period. The slope of the UCL/LCL substantially helps to determine the nature of the signals. Technically speaking, fast movement always generates frequency component and therefore the time period is measured. If the period of time is too short or too long, it indicates frequency outside the interest of the system and the system discards it.

After a first occurrence of five or more fast window groups being trend towards an initial direction, either up trend or down trend, a first timer starts to count for a second occurrence of the subsequent five fast window groups trend towards an opposite direction which triggers a second timer to start to count while the first timer stops. The second timer will count for a third subsequent occurrence of another five fast window groups being trend towards the initial direction. Then, the second timer stops and the first timer will start to count for a fourth occurrence of subsequent five fast window groups being trend towards the opposite direction of the initial direction. Then, the first timer stops again and the second timer starts again to count for a fifth occurrence of subsequent five fast window groups being trend towards the initial direction again.

According to the preferred embodiment, the above detection process is set for three cycles of period detection, including three up trends and three down trends in order to trigger the active condition. In other words, each half cycle has five fast window groups trending towards the same direction within a predetermined time period, indicating an active condition and thus qualifying the active pre-condition into the active condition. In the step (d'), when an active condition is determined, the system generates an output signal to change the output state from restore to active for a predetermined time period according to the preferred embodiment, giving an active pulse for at least one second to the control panel or corresponding device connected to the energy signal detection system.

Figure 7:
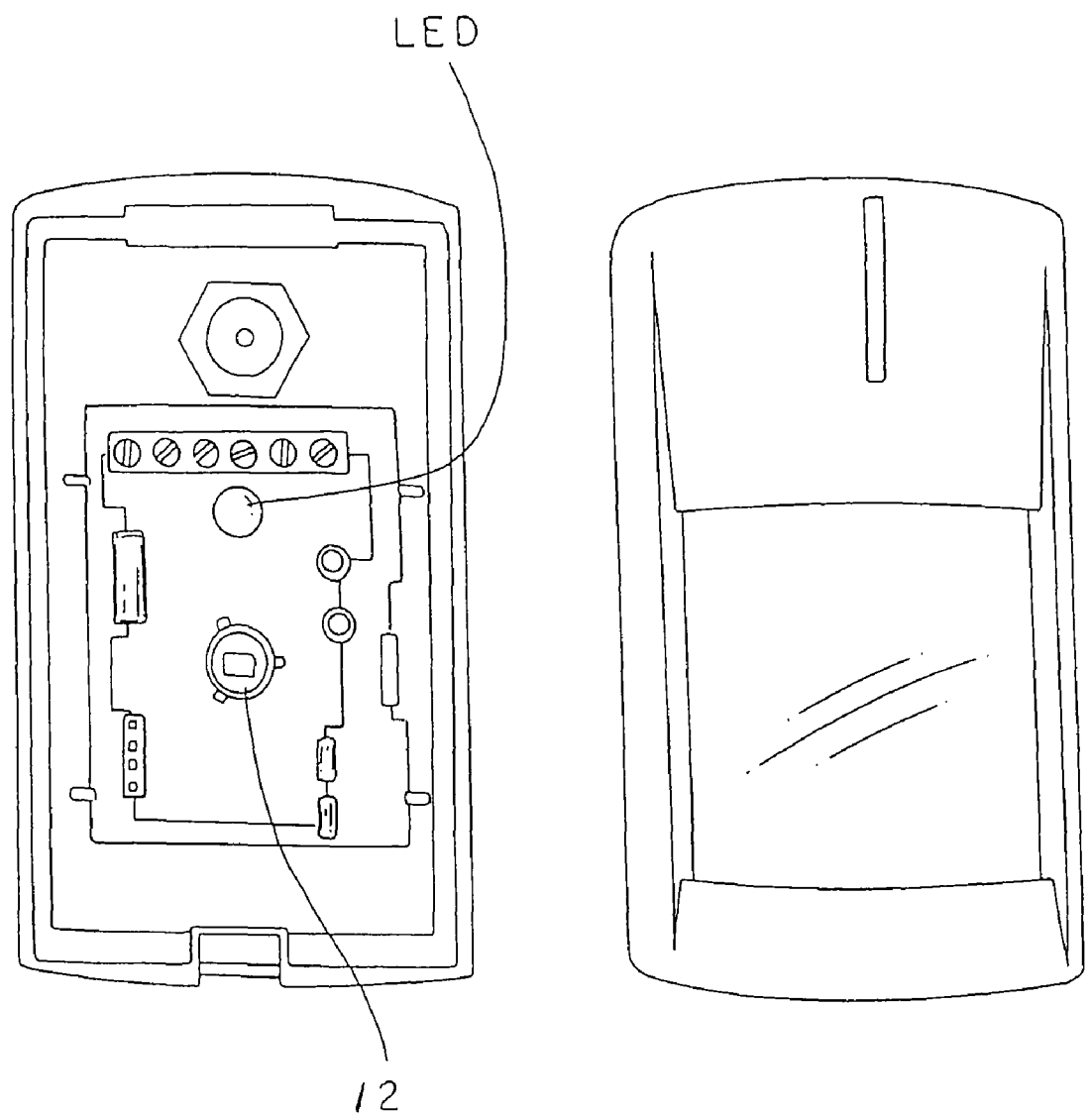
FIG. 7 is a perspective view illustrating the physical components of the energy signal detection system, embodied as a motion sensor, according to the above preferred embodiment of the present invention.
Figure 8:
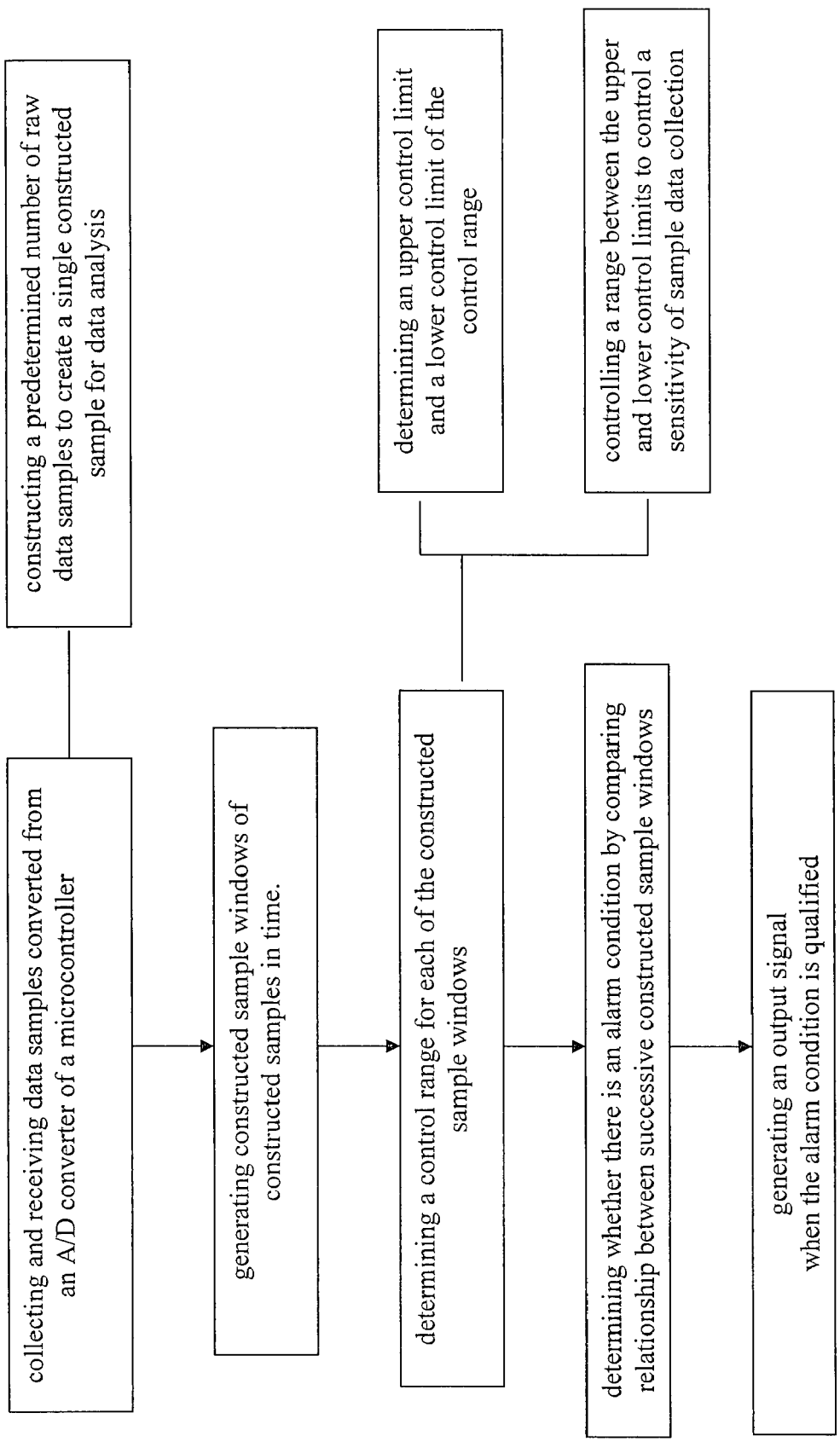
FIG. 8 is a flow diagram for the method of energy signal detection according to the above preferred embodiment of the present invention.
Figure 13:
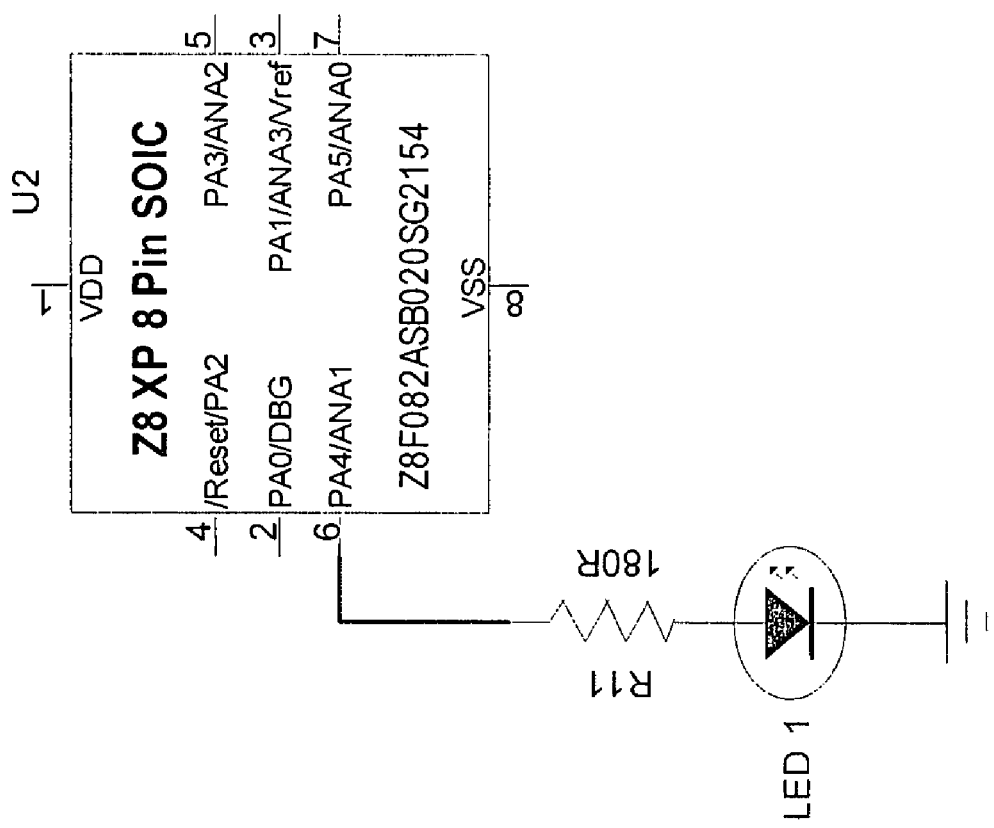
FIG. 13 is an enlarged schematic circuit diagram illustrating the white light detector of the energy signal detection system according to the above preferred embodiment of the present invention.
Figure 14:
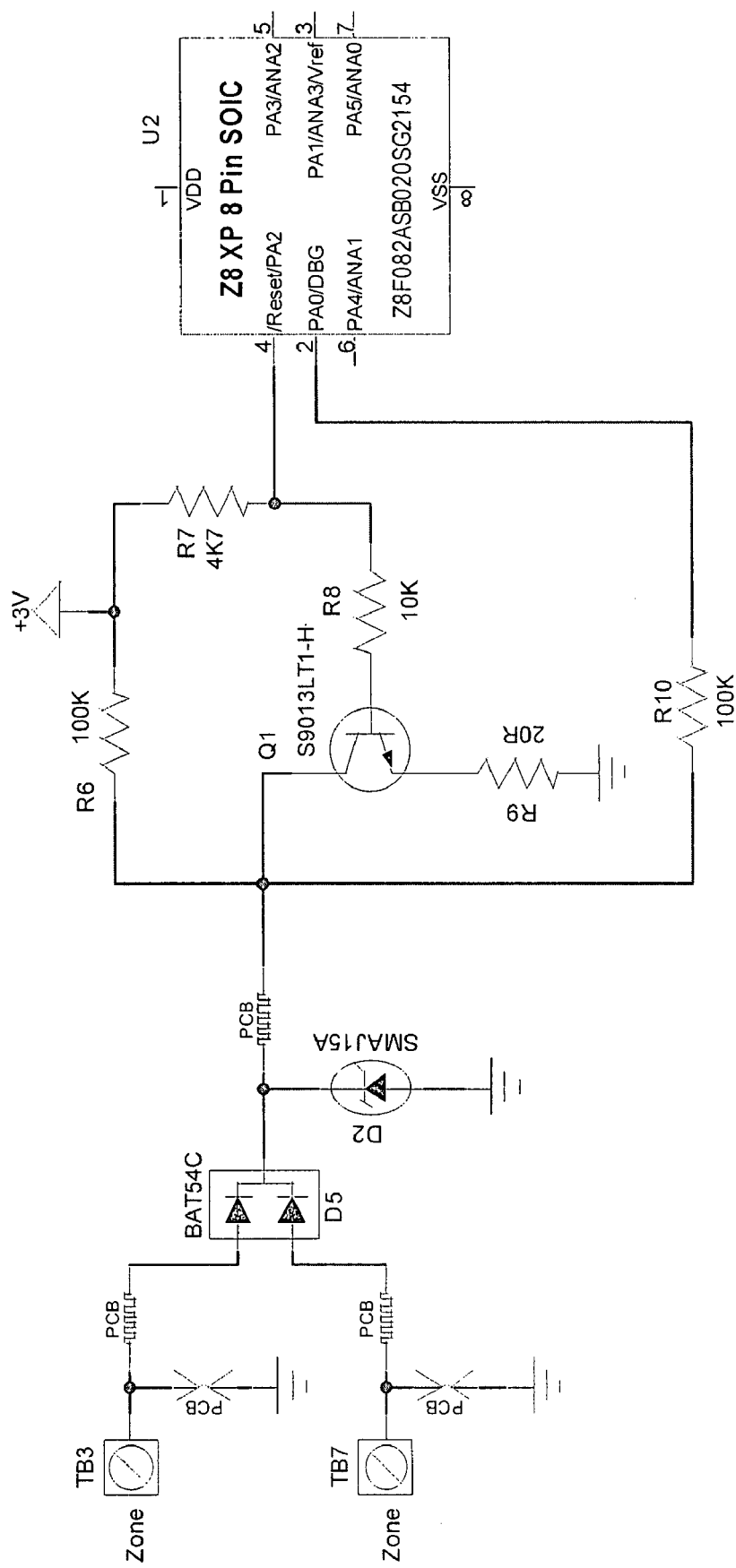
FIG. 14 is an enlarged schematic circuit diagram illustrating the non polarity sensitive alarm output circuit of the energy signal detection system according to the above preferred embodiment of the present invention.
Figure 15:
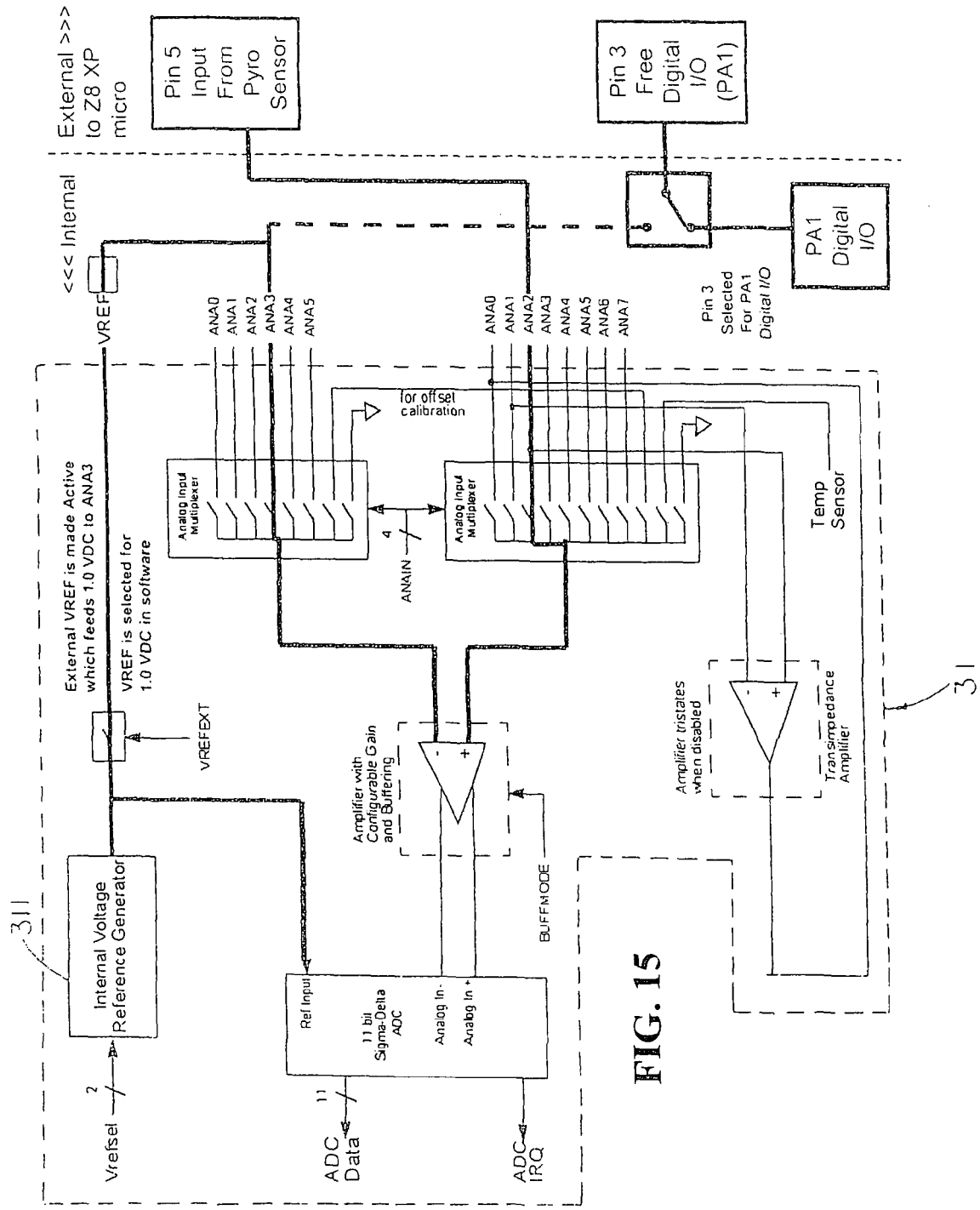
FIG. 15 is a block diagram illustrating the analog-to-digital converter of the energy signal detection system according to the above preferred embodiment of the present invention.

The present invention substantially provides a most economic and innovative method to solve the white light problem by simply taking advantage of the LED that is generally contained in all kinds of energy signal detection system, such as a motion sensor, for indicating movement occurred and whether the sensor is in an ON/OFF condition to the user walking by, without installing any additional part or component. Referring to FIGS. 7 and 13, the energy signal detection system of the present invention comprises a LED electrically connected to PIN6 of the microcontroller 30 and a resistor R11 in series in such a manner that when white light sights on the LED, a measurable mini voltage signal will be generated, which is a mini-voltage change proportional to the intensity of the white light on the LED. The voltage signal is utilized in the energy signal detection system of the present invention as a white light detection and feeds into the microcontroller 30 for data processing. This LED can also work as the light sensor.

An LED can be used as both a visual indicator (emitting light) and a light detector (detecting the presence and strength of light shining on the LED). The act of shining a light (flashlight, laser pointer, etc.) on the LED can be detected and used as an input to a microcontroller 30 in order to change the functionality of an end device. Typical end devices include intrusion motion and smoke detectors. Typical functions include invoking the walk test and self test modes respectively.

An LED is a special version of a Diode that emits light when an electrical current is passed through it in the proper direction. Care must be taken to not pass too much current through the LED (or any Diode) as excessive current will damage the device. Current limiting for an LED is typically performed with a series resistor calculated to deliver currents in the range of 1 to 20 mA to an LED. LEDs are more efficient than incandescent sources of illumination (i.e. typical light bulb) and they do not "burn out". They are highly reliable devices.

Another lesser known property of an LED is that when a light is shined on it the LED will generate a voltage across it. This is in effect a reverse principle to the standard function of the LED. Depending on the magnitude of the light received the voltage generated by an LED can easily exceed 1 volt.

This means that an LED can be used as both a light source (i.e. an indicator) as well as a light intensity detector (i.e. a light meter).

Referring to the diagram in FIG. 13, the two primary modes of operation are the use of the LED 60 as a light source and the use of the LED 60 as a light intensity detector. The diagram in FIG. 13 illustrates how these two operations accomplished. As described in FIG. 13, the energy signal detection system with automatic LED smart indicator comprises:

an I/O section 34 of the microcontroller 30;

an LED 60 electrically connected with the I/O section 34 which is a typical Light Emitting Diode (LED) as described above in the fundamental properties of an LED;

an resistor 61 which is present in order to limit the operational current supplied to the LED 60 when it is being used as an illuminator, wherein the typical values range from 100 to 1000 ohms and are usually calculated to deliver between 1 mA and 20 mA of current to the LED;

an I/O switch 32 which is an internal electrical switch that switches the external pin on the microcontroller 30 to either internal input circuitry which is the A/D converter 50 or to internal output circuitry which is a O/P switch 33 according to a preferred embodiment of the present invention;

an O/P switch 33 which is an internal electrical switch that switches between positive voltage level, preferably 3.3 volts, and negative voltage level, preferably ground level; and an analog-to-digital converter 50 which is an internal device that converts an analog voltage into a digital value wherein the analog voltage generated by the LED 60 in the light intensity detection mode can be accurately measured and used by the microcontroller 30 to make further decisions.

Referring to FIG. 13, when the LED 60 is in Visual Indicator Mode, the I/O switch 32 is set by the microcontroller 30 to position (B) which allows for the microcontroller pin to function as an output. When the microcontroller 30 then selects position (A) of the O/P switch 33 a positive voltage is applied to the LED 60 through the current limiting Resistor 61. The LED 60 then turns on and emits light. In order to turn off the LED the microcontroller 30 changes the position of the O/P switch 33 to position (B) which causes current flow through the LED 60 to cease. When the LED 60 is ON, the typical current flow to the LED 60 is between 1 mA and 20 mA.

When LED 60 is in a Light Intensity Detector Mode (Light Meter), the I/O switch 32 is set by the microcontroller 30 to position (A) which allows for the microcontroller 30 pin to function as an input. The LED 60 is connected through the resistor 61 to the A/D converter 50. A voltage related to the intensity of the light that strikes the LED 60 is generated and passed through the resistor 61 to the A/D converter 50. In this manner the microcontroller 30 can measure the amount of light that is being received by the LED 30. It should be noted that the A/D converter 50 requires an extremely low amount of current in order to make a voltage measurement. This current is easily less than 1 uA. This is significant because according to Ohm's Law "E=I×R" where "E" is the voltage that is dropped (or lost) across the resistor 61, "I" is the current in amps, and "R" is the resistance in Ohms. Since in our application and in this mode, "I" is extremely small (i.e. less than 1 uA) and "R" is relatively small (typically 680 Ohms) then the voltage "E" dropped (or lost) across the resistor is insignificant (i.e. less that 1 mV). The presence of the resistor 61 does not interfere with the measurement of light intensity.

In the Light Intensity Detector Mode, the LED 60 acts as a command receiver in a preferred embodiment. When shine a light the LED 60 in a predetermined manner, the microcontroller 30 can detects it and perform as predetermined. In a preferred embodiment of the present invention, shining a flash light or laser point constantly on the LED 60 for a predetermined period of time means to ask the microcontroller 30 to switch off the LED Visual Indicator Mode. When the microcontroller 30 receives this command, it will stop the LED 60 to emit light. As a result no one can discover the energy signal detector's status by monitoring the LED 60. So a potential thief can not discover the detecting area and the sensitivity of the energy signal detection by monitoring the LED indication. This function is very convenient for people to operate in many different conditions, and didn't increase the cost for fabrication.

As seen in FIG. 13, the microcontroller 30 comprises an I/O switch 32, and an O/P switch 33. When the I/O switch 32 is at position B, and the O/P switch 33 is at position B, there is no electric current passing through LED 60, therefore the LED 60 will not emit light. When the I/O switch 32 is at position B, and the O/P switch 33 is at position A, the LED 60 is constantly on by connecting to power supply. When the I/O switch 32 is at position A, the LED 60 is connected to A/D converter 50.

In an embodiment of the present invention, the sensor component 10 also comprises a wireless communication unit which communicates with other devices through wireless. For a group of systems, when one system detects person, it will switch on the light and informs the next system which the person is approaching. So the next system will switch on the light when the person is close.

Referring to FIGS. 1 and 2, the system of power saving lighting comprises a light component 40 which is controlled by the microcontroller 30 and powered by the power supply component 20 to generate light. In the preferred embodiment, the light component 40 is using LED. LED is fast developed as a light source recently for its inherent advantages. First, LEDs produce more light per watt than do incandescent bulbs which is critical in battery powered or energy saving devices. Second, LEDs are in solid state and are difficult to damage with external shock which is suitable for outdoor lighting; also LEDs have an extremely long life time which is 100 to 1,000 time longer than the regular incandescent light bulbs. Third, LEDs produce don't contain mercury, as fluorescent lamps do. Fourth, LEDs light up very quickly in microseconds, and work well in frequent on-off situation which is idea for digital control which is more accurate and more controllable. Referring to FIG. 1, because the power of one single LED is not large enough, a LED matrix 41 is used in the light component.

According to the present invention, microcontroller 30 based Pulse-width Modulation (PWM) is utilized as the LED brightness control method. PWM is a method of regulating the output energy of a power supply by varying the width, but not the height, of a train of pulses that drives electrical appliances. To control the brightness of the LED matrix 41, the microcontroller 30 switches the power supply component 20 on and off in a constant frequency. By varying the ration of the time of on and off, the microcontroller 30 can vary the average current going through the LED matrix 41. As the voltage of each pulse is constant, the total amount of energy in a period of time is varied by the ration. As a result, the brightness of the LED matrix 41 is varied.

The brightness of the LED matrix 41 can be accurately and smoothly controlled by the microcontroller 30 based PWM control. When the frequency of the pulses is high enough, for example larger than 30 Hz, human eyes will not detect the blinking and will feel the LED is continuously on.

Before switching on the LED matrix 41, the light sensor of the sensor component 10 measures the light of the environment where needs to be illuminated and informs the microcontroller 30. The microcontroller 30 then decides the intend brightness of the LED matrix 41, and drives the LED matrix 41 by PWM control. This efficiently avoids wasting energy when the environment where needs to be illuminated is not extremely dark, at the same time guarantees the amount of light. Also, for different purposes, the brightness of the LED matrix 41 can be adjusted to maximally save the energy.

In a preferred embodiment of the present invention, PWM method applies at three different time periods. At the beginning of starting the lights, the maximum power is provided. After the starting period, the power is intentionally decreased in order to extend the battery life. Taking into account the catering characterization of human's eyes to the ambient light, in the third time period, the power is continually decreased to maintain the battery in minimal required performance. By doing so, the battery life can be extended to 30% plus longer than average/normal usage.

In a preferred embodiment of the present invention, the brightness of the LED matrix 41 can be adjusted by controlling the amount of the LEDs. Switching on less LEDs can provides less light, and vice versa. Switching on all the LEDs of the LED matrix 41 provides the largest amount of light.

Figure 19:
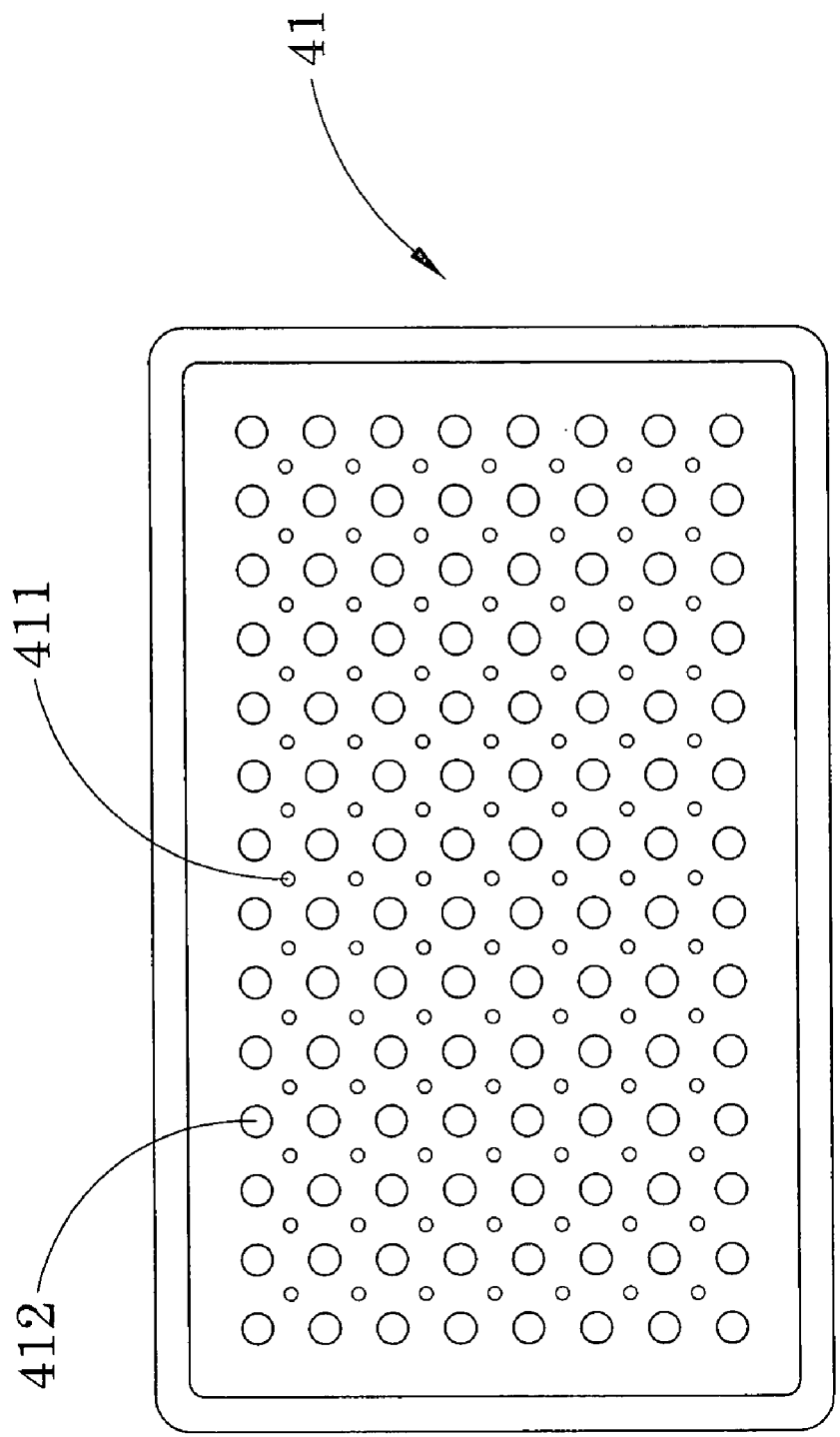
FIG. 19 is a schematic view of the mixed LED matrix wherein the IR LED and the visible light LED is arranged in a predetermined manner according to the above preferred embodiment of the present invention.
Figure 20:
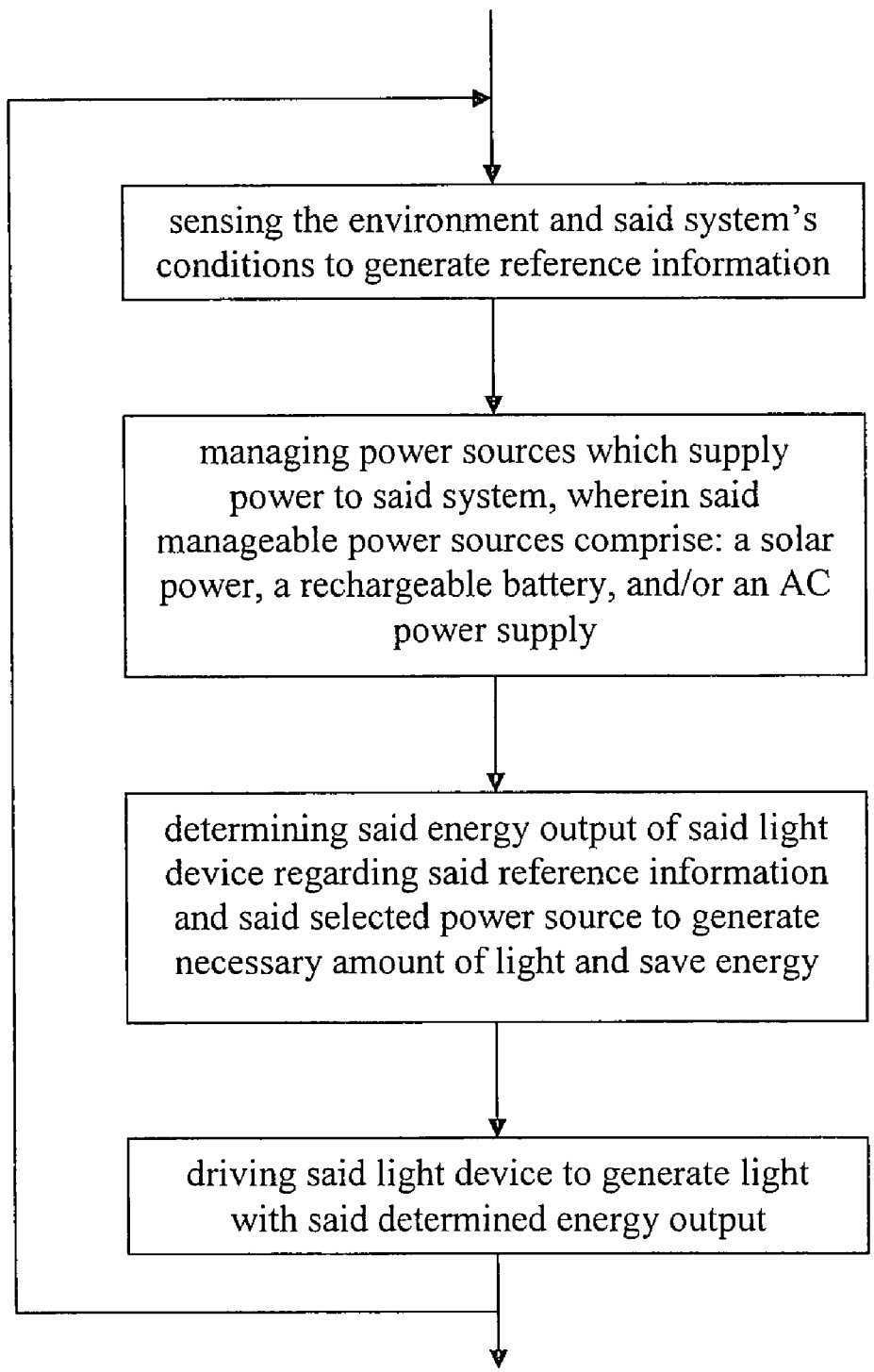
FIG. 20 is a flow diagram for the process of energy saving lighting according to the above preferred embodiment of the present invention.

In an alternative embodiment of the present invention, the LED matrix 41 comprises multiple types of LEDs which generate lights with different wave lengths. Referring to FIG. 19, in a preferred embodiment, the LED matrix comprises two types of LEDs: visible light LED 411, and infrared LED (IR LED) 412. In low light area, the security camera needs IR light source to enhance the image quality. But the energy consuming of IR light source is very large. Using the present invention as camera light source can efficiently arrange the energy consuming, and ensure the light supply. While because the IR light is invisible, the object being illuminated will not notice it. At this moment, illuminating a visible light can act as a warning. Also, the object's first reaction to the light is generally looking at the light source, as a result, the camera will have a good chance to capture the face of the object.

In an alternative embodiment of the present invention, the LED matrix 41 comprises pure infrared LED (IR LED) 412 only. IR LEDs emit invisible lights. In some security systems, IR LEDs can be used to enhance the performance of the surveillance CCTV/cameras to capture clear images in total darkness or low-light conditions. It is a creative embodiment of the present invention to apply the system with pure IR LEDs or/and combining with visible LED plus motion detection; solar power source technologies in security/life safety systems.

According to the present invention, a microcontroller 30 coordinates the performance of different components of the system to achieve power saving illumination.

First, the microcontroller 30 collects reference information generated by the sensor component 10 to discover the circumstance and the condition of the system of power saving lighting. This reference information comprises the light of the environment, human activities, power supply situation, and battery's conditions.

Second, the microcontroller 30 selects the power supply from the power supply component 20 according to the information and according to the application of the present invention. The applications of the system of power saving lighting comprises: emergency lighting backup; security and safety enhancement which supply bright LEDs project for visual warning and surveillance system recording; energy saving lighting for commercial, industry, and residential area; and lighting in remote area.

For example, when this system is used as emergency lighting backup, when there is sufficient sunlight, the microcontroller 30 will select solar power to supply energy to the system for lighting and battery charging. When there is no sufficient sunlight, the microcontroller 30 will select the AC power to charge the battery to make sure the battery is fully charged. During emergency and there is no AC power, the battery can supply the power for lighting.

Third, the microcontroller 30 controls the charging and discharging according to the status of power supply and the condition of the rechargeable battery 221. The microcontroller 30 selects the optimized method to charge and discharge the battery in order to efficiently utilize energy, and maximally enlarge the life time of the battery.

Forth, the microcontroller 30 controls the illumination of the light component 40. According to the reference information collected from the sensor component 10 of the system, the microcontroller 30 decides whether to switch on or off the light component 40, the brightness of the illumination, and the method to drive the light component 40.

For example, in an embodiment of the present, the motion detector feeds the information of motion signals to the microcontroller 30. The microcontroller 30 analyzes the information, if a human activity is identified, and the area is dark, the microcontroller 30 will switch on the light component 40 to illuminate the area. If no more human activity is identified or after a predetermined time of delay, the microcontroller 30 will switch off the light component 40 to save energy.

The microcontroller 30 also control the brightness of the light component 40 regarding the light of the predetermined the area to illuminate, and also regarding the status of power supply. For different application, different amount of light is required in the predetermined the area. Referring to the amount of light sensed by the light sensor, the microcontroller 30 calculates the brightness of the light component 40 needs to supply, and drive the light component 40 to illuminate. In a preferred embodiment, the light component 40 comprises a LED matrix, and the microcontroller 30 uses PWM to control the brightness. The microcontroller 30 also adjusts the brightness of the light component 40 regarding the condition of the rechargeable battery 221. It reduces the brightness when the charging level of the battery is low to avoid overdischarging.

Fifth, the microcontroller 30 controls other functions. In an alternative embodiment, the system of power saving lighting further comprises a wireless communication component. The wireless communication components transfers and receives information with other system. For example, when one system detects a people approaching, it will switch on its light component 40. At the same time it will inform the next system through wireless. The next system will then also switch on its light component 40 for the coming people.

In another embodiment of the present invention, the microcontroller 30 processes user's commands. For example, through remote controller, the user can adjust the brightness of the light component 40; the user can switch the light component 40 on for a predetermined period of time continuously.

According to the present invention, the process of power saving lighting comprises the following steps:
(a) sense the environment situation and the power supply status wherein to generate power control reference information;
(b) manage the power source wherein to guarantee power supply and save power wherein said power source comprises solar power, rechargeable battery, and/or AC power;
(c) determine lighting output regarding said reference information and said selected power source wherein to generate minimally required amount of light; and
(d) drive the light devices.

The step (a) further comprises steps:
(a1) sense the environment light wherein to determine the amount of light is needed to illuminate the predetermined area;
(a2) sense the situation of power supply wherein to determine the amount of light can be illuminated; and
(a3) sense the motion in the predetermined area wherein to determine if illumination is required.

In step (a1), the environment light is detected. Referring the environment light, the amount of light which is illuminated by the lighting system is calculated to make sure only necessary amount of energy will be utilized. This will largely save the energy.

In step (a2), the situation of power supply is monitored. The situation of power supply is also considered in determination of the mount of light should be illuminated by the lighting system. When there is no enough power supply, lower level illumination is accepted to save the energy and to protect the power supply element, for example, to prevent overdischarging of the battery.

In step (a3), motion detector is used to detect any motion happens in the predetermined area. When there is no motion or human activity is detected, it means no illumination or less illumination is needed, so the lighting element can be switched off or set in a lower level to save energy. When a motion or human activity is detected, the lighting element will be set to illuminate the predetermined area for purpose.

The step (b) further comprises steps:
(b1) select a power source;
(b2) control the charging of the rechargeable battery when needed; and
(b3) control the discharging of the rechargeable battery when needed.

In step (b1), the process of power saving lighting first selects solar power if there is enough sunlight. Otherwise, the rechargeable battery is selected to supply power to the lighting system. If AC power is available, the process will select AC power when both solar power and battery are not available.

In step (b2), the process of power saving lighting controls the charging of the rechargeable battery when there is enough solar power and the rechargeable battery is not fully charged. According to the type of the rechargeable battery used in the system, different methods are applied. In a preferred embodiment of this invention, Lithium-polymer (Li-Poly) battery is used, and pulsed charge method which feeds the charge current to the battery in pulses is applied. The charging rate is controlled by varying the width of the pulse. This process also decides the dissipation of the charging when the rechargeable battery is fully charged in order to protect the battery from overcharging. The temperature and upper voltage limit are also considered for battery protection.

In step (b3), battery discharging is also controlled to optimize the usage of battery electricity, and prolong the life time of the battery. Overdischarging, or taking the cells below the recommended voltage are prevented. In this step, once the depth of discharge reaches a predetermined level, and both solar power and AC power are not available, the energy output of the system will be lowered to reduce the rate of battery discharging. When the depth of discharging reaches a predetermined deep level and no alternative power supply is available, energy output will be shut down to prevent overdischarging.

In step (c), the reference information generated by steps (a1), (a2), and (a3) is considered to decide when to switch on/off the lighting component, and the amount of energy output is needed. In an embodiment of the present invention, the lighting system can be switched on/off scheduled. It can be scheduled by time and date. For example, the lighting system can be set to switch on from 9 pm to 6 am during week day. For another example, the lighting system can be set to be continuously on during a special period of time, such as a party time, even no motion is detected at the moment.

In an alternative embodiment of the present invention, step (c) further comprises step:
(c1) receive commands wherein to control the performances of the lighting system.

Users can change the settings of the system by inputting commands. These commands comprises: setting the on/off time and date; setting the brightness of the illumination; and setting the sensitivity of the sensors.

In a preferred embodiment of the present invention, in step (c1) the system receives commands from a remote control for setting more functions and features. For example, users can use remote control to pre set timing/FF and activate the light.

In another embodiment of the present invention, step (c) further comprises step:

(c2) communicate with other system through wireless.

In step (c2), through wireless, systems communicate with each other. In one embodiment, for example, when one system detects a person's approaching, it switches on the light, and informs the next system to switch on the light before this person come.

In step (d), the process drives the lighting devices to generate light as determined in step (c). In a preferred embodiment of the present invention, the lighting is using LED matrix as light source. To control the LED matrix, the process uses PWM. PWM is a method of regulating the output energy of a power supply by varying the width, but not the height, of a train of pulses that drives electrical appliances. To control the brightness of the LED matrix, the power supply component 20 is switched on and off in a constant frequency. By varying the ration of the time of on and off, the average current going through the LED matrix is varied. As a result, the brightness of the LED matrix is varied. In an embodiment of the present invention, the process uses PWM at three different control/processing stages to ensure to provide needed power source in best performance and maximally save the batter life.

In an embodiment of the present invention, the process generates LED matrix with multiple wave lengths. In a preferred embodiment, the mixed wave lengths comprise IR and visible LED light. The IR light is generated only when motion is detected to save the energy. The visible LED light is generated to warm the object, and to attract the object's notice.

In an embodiment of the present invention, the system can be used in security systems for enhancing security purpose with pure IR LEDs or/and combined visible LEDs plus motion detection or/and solar powered technologies in the process.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system of energy saving lighting, comprising:
a sensor component which comprises a motion sensor having a detecting area and a light sensor for measuring light intensity in said detecting area;
a power supply component, which comprises a solar power supply element which converts solar power to electrical energy, and a rechargeable battery element being charged by said solar power supply element to form a power source;
a light component which is electrically connected to said power supply component to generate light; and
a microcontroller which not only controls charging and discharging of said rechargeable battery element but also controls said light component in responsive to said sensor component, wherein when said motion sensor detects a motion within said detecting area, said light sensor is activated for measuring the light intensity in said detecting area, at the same time, said microcontroller determines a brightness of said light being required within said detecting area in responsive to the light intensity being measured by said light sensor, such that said light component is controlled to initially generate enough said light within said detecting area, wherein when there is not motion within said detecting area, said light component is switched off by said microcontroller.

2. The system, as recited in claim 1, wherein said microcontroller controls said light component to gradually reduce the brightness of said light after said light component is initially activated, so as to maximally save said electrical energy being stored in said rechargeable battery element.

3. The system, as recited in claim 1, wherein said microcontroller is controllably linked to said power supply component to monitor an energy level of said rechargeable battery element and is arranged in such a manner that when said energy level of said rechargeable battery element is detected below a predetermined threshold, said microcontroller is activated to automatically reduce the brightness of said light generated by said light component.

4. The system, as recited in claim 2, wherein said microcontroller is controllably linked to said power supply component to monitor an energy level of said rechargeable battery element and is arranged in such a manner that when said energy level of said rechargeable battery element is detected below a predetermined threshold, said microcontroller is activated to automatically reduce the brightness of said light generated by said light component.

5. The system, as recited in claim 1, wherein said light component comprises an LED matrix controlled by said microcontroller to generate said light and being switched on and off in a timely constant frequency by said microcontroller to selectively adjust the brightness of said light being generated by said LED matrix.

6. The system, as recited in claim 4, wherein said light component comprises an LED matrix controlled by said microcontroller to generate said light and being switched on and off in a timely constant frequency by said microcontroller to selectively adjust the brightness of said light being generated by said LED matrix.

7. The system, as recited in claim 1, wherein said motion sensor produces inputted energy signals to said microcontroller when said motion sensor detects the motion within said detecting area, wherein said microcontroller further comprises means for converting said inputted energy signals into data samples, wherein said data samples are constructed to form a predetermined number of constructed sample windows of constructed samples in time, wherein a control range is determined for each of said constructed sample windows, wherein by comparing said relationship between said successive constructed sample windows, said microcontroller is capable of determining whether there is a need to switch on said light component.

8. The system, as recited in claim 6, wherein said motion sensor produces inputted energy signals to said microcontroller when said motion sensor detects the motion within said detecting area, wherein said microcontroller further comprises means for converting said inputted energy signals into data samples, wherein said data samples are constructed to form a predetermined number of constructed sample windows of constructed samples in time, wherein a control range is determined for each of said constructed sample windows, wherein by comparing said relationship between said successive constructed sample windows, said microcontroller is capable of determining whether there is a need to switch on said light component.

9. The system, as recited in claim 7, wherein said motion sensor is a pyroelectric sensor which comprises a signal conversion module, and is adapted to sense energy radiation for motion detection, wherein said infrared radiation as an input signal is converted into an output signal through said signal conversion module, wherein said output signal contains real signal with low frequency and noise signal mixed therewith.

10. The system, as recited in claim 8, wherein said motion sensor is a pyroelectric sensor which comprises a signal conversion module, and is adapted to sense energy radiation for motion detection, wherein said infrared radiation as an input signal is converted into an output signal through said signal conversion module, wherein said output signal contains real signal with low frequency and noise signal mixed therewith.

11. The system, as recited in claim 9, wherein said converting means of said microcontroller comprises an analog to digital converter converting said output signals from said pyroelectric sensor to data samples for data processing.

12. The system, as recited in claim 10, wherein said converting means of said microcontroller comprises an analog to digital converter converting said output signals from said pyroelectric sensor to data samples for data processing.

13. The system, as recited in claim 1, wherein said light component comprises one or more infrared LEDs to generate infrared light.

14. The system, as recited in claim 12, wherein said light component comprises one or more infrared LEDs to generate infrared light.

15. The system, as recited in claim 1, wherein said light component comprises one or more infrared LEDs to generate infrared light and one or more visible light LEDs to generate visible light.

16. The system, as recited in claim 12, wherein said light component comprises one or more infrared LEDs to generate infrared light and one or more visible light LEDs to generate visible light.

17. A process of generating power saving lighting, comprising the step of:
(a) controlling charging and discharging of a rechargeable battery element, wherein said rechargeable battery element stores electrical energy being converted from solar energy which is collected by a solar power element;
(b) detecting any motion by a motion sensor within a detecting area thereof;
(c) measuring light intensity in said detecting area by a light sensor once said motion sensor detects a motion within said detecting area;
(d) determining a brightness of light being required within said detecting area in responsive to the light intensity being measured by said light sensor;
(e) activating a light component to initially generate enough light within said detecting area; and
(f) switching off said light component once there is not motion within said detecting area.

18. The process, as recited in claim 17, wherein the step (e) further comprises the steps of
(e.1) maximizing a power of said light component to initially generate enough light within said detecting area in responsive to the light intensity being measured by said light sensor;
(e.2) decreasing said power of said light component to gradually reduce the brightness of said light after said light component is initially activated; and
(e.3) maintaining minimum power of said light component to maximally save said electrical energy being stored in said rechargeable battery element.

19. The process, as recited in claim 18, wherein, in the step (e), an LED matrix of said light component is controlled by a microcontroller to generate said light and is switched on and off in a timely constant frequency by said microcontroller to selectively adjust the brightness of said light being generated by said LED matrix.

20. The process, as recited in claim 19, wherein the step (b) further comprises the steps of:
(b.1) producing inputted energy signals by said motion sensor when said motion sensor detects a motion within said detecting area;
(b.2) converting said inputted energy signals into data samples, wherein said data samples are constructed to form a predetermined number of constructed sample windows of constructed samples in time;
(b.3) determining a control range is determined for each of said constructed sample windows; and
(b.4) by comparing a relationship between said successive constructed sample windows, determining whether there is a need to switch on said light component.

21. The process, as recited in claim 20, wherein said motion sensor is a pyroelectric sensor which comprises a signal conversion module, and is adapted to sense energy radiation for motion detection, wherein said infrared radiation as an input signal is converted into an output signal through said signal conversion module, wherein said output signal contains real signal with low frequency and noise signal mixed therewith.

22. The process as recited in claim 21 wherein, in the step (b.2), said output signals are converted from said pyroelectric sensor to said data samples for data processing by an analog to digital converter.

23. The process, as recited in claim 17, wherein said light component comprises one or more infrared LEDs to generate infrared light.

24. The process, as recited in claim 22, wherein said light component comprises one or more infrared LEDs to generate infrared light.

25. The process, as recited in claim 17, wherein said light component comprises one or more infrared LEDs to generate infrared light and one or more visible light LEDs to generate visible light.

26. The process, as recited in claim 22, wherein said light component comprises one or more infrared LEDs to generate infrared light and one or more visible light LEDs to generate visible light.

27. The process, as recited in claim 17, wherein the step (a) further comprises the step of:
(a.1) operating said solar power element when energy supply therefrom is sufficient;
(a.2) operating said rechargeable battery element when energy of said solar power element is not sufficient and when a voltage of said rechargeable battery is not lower than a predetermined level; and
(a.3) connecting to a AC power supply as a power supply when said solar power and said rechargeable battery element have insufficient energy.

28. The process, as recited in claim 26, wherein the step (a) further comprises the step of:
(a.1) operating said solar power element when energy supply therefrom is sufficient;
(a.2) operating said rechargeable battery element when energy of said solar power element is not sufficient and when a voltage of said rechargeable battery is not lower than a predetermined level; and
(a.3) connecting to a AC power supply as a power supply when said solar power and said rechargeable battery element have insufficient energy.

* * * * *